United States Patent
Toya et al.

(10) Patent No.: US 8,248,028 B2
(45) Date of Patent: Aug. 21, 2012

(54) DEVICE HOUSING A BATTERY AND CHARGING PAD

(75) Inventors: Shoichi Toya, Minamiawaji (JP); Kyozo Terao, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 304 days.

(21) Appl. No.: 12/765,235

(22) Filed: Apr. 22, 2010

(65) Prior Publication Data

US 2010/0270970 A1 Oct. 28, 2010

(30) Foreign Application Priority Data

Apr. 28, 2009 (JP) ................................. 2009-110176

(51) Int. Cl.
*H02J 7/00* (2006.01)
(52) U.S. Cl. .......................... 320/108; 320/107; 320/115
(58) Field of Classification Search .................... 320/108
See application file for complete search history.

(56) References Cited

U.S. PATENT DOCUMENTS

| | | | | |
|---|---|---|---|---|
| 5,617,003 | A * | 4/1997 | Odachi et al. ................. | 320/108 |
| 5,703,461 | A * | 12/1997 | Minoshima et al. .......... | 320/108 |
| 5,821,731 | A * | 10/1998 | Kuki et al. .................... | 320/108 |
| 2008/0116847 | A1 * | 5/2008 | Loke et al. ..................... | 320/108 |
| 2009/0033280 | A1 * | 2/2009 | Choi et al. ..................... | 320/108 |
| 2009/0079387 | A1 * | 3/2009 | Jin et al. ........................ | 320/108 |
| 2009/0153098 | A1 | 6/2009 | Toya et al. | |
| 2009/0224723 | A1 * | 9/2009 | Tanabe .......................... | 320/108 |
| 2009/0284227 | A1 * | 11/2009 | Mohammadian et al. ..... | 320/137 |
| 2010/0314946 | A1 * | 12/2010 | Budde et al. .................. | 307/104 |

FOREIGN PATENT DOCUMENTS

| | | |
|---|---|---|
| JP | 3011829 | 6/1995 |
| JP | 9-63655 | 3/1997 |

* cited by examiner

*Primary Examiner* — Arun Williams
(74) *Attorney, Agent, or Firm* — Wenderoth, Lind & Ponack, LLP

(57) ABSTRACT

The charging pad 10 is provided with a position detection controller 14 that supplies position detection signals to position detection coils 30, and detects induction coil 51 position from echo signals output from the induction coil 51. The device housing a battery 50 is provided with a series capacitor 55 connected in series with the induction coil 51, a parallel capacitor 56 connected in parallel with the induction coil 51, and a switching circuit 57. When the position detection controller 14 is issuing position detection signals, the parallel capacitor 56 is connected to the induction coil 51. When power is transmitted from the power supply coil 11 to the induction coil 51, the parallel capacitor 56 is not connected to the induction coil 51 and induction coil 51 AC is output to a rectifying circuit 53 through the series capacitor 55.

19 Claims, 13 Drawing Sheets

DEVICE HOUSING A BATTERY AND CHARGING PAD

BACKGROUND OF THE INVENTION

1. Field of the Invention

The present invention relates to a device housing a battery (batteries) such as a battery pack or mobile telephone, and to a charging pad that transmits power by magnetic induction to the device housing a battery to charge the battery inside.

2. Description of the Related Art

A charging pad (charging stand, charging cradle) has been developed to charge a battery housed in a device by transmitting power from a power supply coil (primary coil) to an induction coil (secondary coil) by magnetic induction. (Refer to Japanese Laid-Open Patent Publication HEI 9-63655 (1997) and Utility Model Registration No. 3011829.)

JP H09-63655 A cites a configuration with a charging pad housing a power supply coil driven by an alternating current (AC) power source, and a battery pack housing an induction coil that magnetically couples with the power supply coil. The battery pack houses circuitry to rectify the AC power induced in the induction coil and supply the rectified power to charge the battery. With this system, a battery pack can be placed on the charging pad to charge the battery pack battery without direct physical contact.

JP 3011829 U cites a configuration with a battery housed in the bottom part of an electrical device, a secondary-side charging adapter provided beneath the battery, and an induction coil and charging circuit housed in the secondary-side charging adapter.

A charging pad is also cited that is provided with a power supply coil to magnetically couple with the induction coil. The device housing a battery is placed on the charging pad to magnetically couple the secondary-side charging adapter, power is transmitted from the power supply coil to the induction coil, and the battery in the device is charged.

SUMMARY OF THE INVENTION

JP H09-63655 A has the drawback that the battery pack cannot be charged when it is shifted out of proper position on the charging pad. This is because if the position of a mobile electronic device (housing a battery) is shifted relative to the charging pad, the power supply coil and induction coil cannot magnetically couple, and AC power cannot be transmitted from the power supply coil to the induction coil. As described in JP 3011829 U, an alignment projection can be established on the charging pad, and an alignment hole can be provided in the mobile electronic device to insert the alignment projection and reduce position shift between the mobile electronic device and the charging pad. However, even with this structure, the power supply coil and the induction coil cannot always be disposed in precise relative positions.

To further correct this drawback, the present applicants developed a charging pad configured with a movable power supply coil. This system detects the induction coil in a device housing a battery placed on the charging pad, and moves the power supply coil into close proximity with the induction coil. FIG. 1 is a circuit diagram showing the charging pad 110 and the device housing a battery 150 that is placed on the charging pad 110. The charging pad 110 is provided with a position detection controller 114 to detect the position of the induction coil 151. FIG. 2 shows a block diagram of the position detection controller 114. The position detection controller 114 is provided with a plurality of position detection coils 130, a detection signal generating circuit 131, a receiving circuit 132, and a discrimination circuit 133. The plurality of position detection coils 130 is mounted inside the charging pad case top plate where a device housing a battery 150 is placed. The detection signal generating circuit 131 supplies position detection signal pulses to the position detection coils 130. The receiving circuit 132 receives echo signals from the position detection coils 130 that result from excitation of the induction coil 151 by position detection signals supplied to the position detection coils 130 from the detection signal generating circuit 131. The discrimination circuit 133 determines the position of the induction coil 151 from the echo signals received by the receiving circuit 132. The discrimination circuit 133 is provided with a memory circuit 137 to store the amplitude of the echo signal induced in each position detection coil 130.

The position detection controller determines the position of the induction coil in the following manner.

(1) The detection signal generating circuit 131 outputs a pulse detection signal to a position detection coil 130.
(2) The position detection coil 130 is excited by the pulse detection signal. As shown in FIG. 3, an echo signal is output from the induction coil 151 to the position detection coil 130.
(3) The receiving circuit 132 receives the echo signal.
(4) Each of the plurality of position detection coils 130 is sequentially switched to excite each position detection coil 130 with a pulse detection signal and receive an echo signal with that position detection coil 130.
(5) The discrimination circuit 133 stores the amplitude of the echo signal induced in each position detection coil 130 in the memory circuit 137, and compares echo signal amplitudes to determine the position of the induction coil 151. The amplitude of the echo signal in a position detection coil 130 close to the induction coil 151 is high, and echo signal amplitude drops off as the position of the induction coil 151 becomes further away from the detection coil 130. Consequently, the discrimination circuit 133 can determine the induction coil 151 position from echo signal amplitude. The position detection controller 114 of FIG. 2 has position detection coils 130 disposed in orthogonal x and y-directions. The position of the induction coil 151 in the x-direction is determined by x-axis detection coils 130A, and the position of the induction coil 151 in the y-direction is determined by y-axis detection coils 130B.

As shown in the circuit diagram of FIG. 1, a parallel resonant circuit is formed by connecting a capacitor 153 in parallel with the induction coil 151, and the position detection controller 114 triggers resonance with a pulse signal causing an echo signal to be generated. However, a capacitor 153 connected in parallel with the induction coil 151 has the drawback that power efficiency is reduced when the internal battery 152 is charged by power induced in the induction coil 151.

The present invention was developed with the object of further correcting the drawbacks described above. Thus, it is an important object of the present invention to provide a device housing a battery and charging pad that connect a parallel resonant circuit to generate echo signals to accurately determine the position of the induction coil when the battery is not being charged, and disconnect the parallel capacitor during battery charging to enable battery charging in a power efficient manner.

The device housing a battery and charging pad of the present invention have a charging pad 10 provided with a power supply coil 11, and a device housing a battery 50, 60, 70 that contains an induction coil 51 to magnetically couple with the power supply coil 11. A battery 52 inside the device housing a battery 50, 60, 70 is charged by power transmitted from the power supply coil 11 to the induction coil 51. The charging pad 10 is provided with a case 20 having a charging region where a device housing a battery 50, 60, 70 can be placed in a removable manner, an AC power source 12 connected to the power supply coil 11, a moving mechanism 13 that moves the power supply coil 11 close to the induction coil 51, and a position detection controller 14, 44 that determines the position of the device housing a battery 50, 60, 70 and controls the moving mechanism 13 to move the power supply coil 11 close to the induction coil 51 of the device housing a battery 50, 60, 70. The position detection controller 14, 44 is provided with position detection coils 30 fixed to a top plate 21, a detection signal generating circuit 31 that supplies position detection signals to the position detection coils 30, a receiving circuit 32 that receives echo signals from the position detection coils 30 resulting from excitation of the induction coil 51 by position detection signals supplied to the position detection coils 30 from the detection signal generating circuit 31, and a discrimination circuit 33 that determines induction coil 51 position from the echo signals received by the receiving circuit 32. The device housing a battery 50, 60, 70 is provided with a rectifying circuit 53 connected to the induction coil 51 to convert AC power induced in the induction coil 51 to direct current (DC) to supply the battery 52 with charging power, a series capacitor 55 connected in series with the induction coil 51 to input induction coil 51 AC to the rectifying circuit 53, a parallel capacitor 56 connected in parallel with the induction coil 51, and a switching circuit 57, 67, 77 that switches the connection of the series capacitor 55, the parallel capacitor 56, and the induction coil 51. When the position detection controller 14, 44 is issuing position detection signals, the device housing a battery 50, 60, 70 switching circuit 57, 67, 77 connects the parallel capacitor 56 to the induction coil 51. When power is transmitted from the power supply coil 11 to the induction coil 51, the parallel capacitor 56 is disconnected from the induction coil 51, and AC power is output from the induction coil 51 to the rectifying circuit 53 through the series capacitor 55.

The device housing a battery and charging pad described above have the characteristic that while a parallel resonant circuit is normally connected for accurate location of the induction coil, the parallel capacitor is disconnected during battery charging to allow the internal battery to be charged in a power efficient manner. This is because during detection of the induction coil position, echo signal generation depends on connection of the parallel capacitor to the induction coil. In addition, during charging of the internal battery, power efficient battery charging depends on disconnection of the parallel capacitor to allow induction coil power to be output to the rectifying circuit through the series-connected capacitor. Power efficiency during charging is improved by a circuit configuration that connects a capacitor in series with the induction coil compared to prior art circuit configurations with a capacitor connected in parallel with the induction coil. With this configuration, heat generation during charging can be controlled, and the internal battery can be charged efficiently, rapidly, and safely.

In the device housing a battery and charging pad of the present invention, the charging region of the charging pad 10 can be a top plate 21 established on the upper surface of the case 20. This charging pad has the characteristic that a device housing a battery can be placed anywhere on the top plate to efficiently charge the battery inside.

In the device housing a battery and charging pad of the present invention, the switching circuit 57 can be provided with a switching device 58 connected in series with the parallel capacitor 56. When the switching device 58 is in the ON state, the parallel capacitor 56 is connected in parallel with the induction coil 51. When the switching device 58 is in the OFF state, the parallel capacitor 56 is disconnected from the induction coil 51. This device housing a battery has the characteristic that a parallel resonant circuit can be switched into or out of the induction coil circuit to increase power efficiency and allow efficient charging of the internal battery while maintaining a simple circuit structure.

In the device housing a battery and charging pad of the present invention, the switching circuit 67 can be provided with a pair of series-connected switching devices 68. Parallel capacitors 56 can be connected in series with the pair of switching devices 68, and the connection node of the two switching devices 68 can be connected to the ground line 63. Each switching device 68 is connected to an end of the induction coil 51 through a parallel capacitor 56. When the pair of switching devices 68 is in the ON state, the parallel capacitors 56 are connected to the induction coil 51. When the pair of switching devices 68 is in the OFF state, the parallel capacitors 56 are disconnected from the induction coil 51. This device housing a battery can connect a parallel resonant circuit for accurate location of the induction coil without making a common connection between the induction coil and the rectifying circuit ground line. Further, this device housing a battery has the characteristic that power efficiency can be increased to enable efficient charging of the internal battery.

In the device housing a battery and charging pad of the present invention, the pair of switching devices 68 can be field effect transistors (FETs).

In the device housing a battery and charging pad of the present invention, the rectifying circuit 53 can be provided with a diode bridge, and the induction coil 51 can be connected to the ground line 63 through the diodes. In this device housing a battery, neither end of the induction coil is connected to the ground line on the output-side of the diode bridge. This allows induction coil output to be efficiently rectified by the diode bridge for efficient charging of the internal battery.

In the device housing a battery and charging pad of the present invention, the series capacitor 55 and parallel capacitor 56 can be implemented by a single series/parallel capacitor 75, and the switching circuit 77 can be a shorting circuit 73 that short circuits the rectifying circuit 53 side of the series/parallel capacitor 75. When the shorting circuit 73 short circuits the rectifying circuit 53 side of the series/parallel capacitor 75, the series/parallel capacitor 75 is connected in parallel with the induction coil 51. When the shorting circuit 73 is not short circuited, the series/parallel capacitor 75 is connected in series with the rectifying circuit 53 to output induction coil 51 AC power to the rectifying circuit 53 through the series-connected series/parallel capacitor 75. In this device housing a battery, a single capacitor is switched to allow its use as both a series capacitor and a parallel capacitor. Consequently, the device housing a battery has the characteristic that a parallel resonant circuit can be switched into or out of the induction coil-rectifying circuit to improve internal battery charging efficiency while maintaining a simple circuit structure.

In the device housing a battery and charging pad of the present invention, the position detection controller 14 can be provided with a first position detection controller 14A that roughly determines the position of the induction coil 51 in the device housing a battery 50, 60, 70, and a second position detection controller 14B that determines induction coil 51 position with precision. The first position detection controller 14A can be provided with a plurality of position detection coils 30, a detection signal generating circuit 31, a receiving circuit 32, and a discrimination circuit 33. This charging pad can move the power supply coil 11 close to the induction coil 51 with the first position detection controller 14A, and subsequently move the power supply coil 11 closer to the induction coil 51 with the second position detection controller 14B.

The device housing a battery and charging pad described above is provided with a first position detection controller that roughly determines the position of the induction coil of the device housing a battery, and a second position detection controller that determines the position of the induction coil with precision. Since the first position detection controller moves the power supply coil close to the induction coil and the second position detection controller then moves the power supply coil closer to the induction coil, this charging pad is characterized by the ability to accurately locate the induction coil. The first position detection controller of the charging pad described above sends position detection signals to the plurality of position detection coils fixed to the top plate, the parallel resonant circuit formed by the induction coil and parallel capacitor is excited by the position detection signals to output echo signals back to the position detection coils, and the echo signals are received by the receiving circuit to determine the position of the induction coil. As a result, the position of the induction coil can be determined electrically over a wide detection region with the plurality of position detection coils. Since this configuration can efficiently locate an induction coil over a wide region, it is extremely effective as the first position detection controller that roughly determines the position of the induction coil of the device housing a battery.

In the device housing a battery and charging pad of the present invention, the AC power source 12 has a self-excited oscillator circuit, and the second position detection controller 14B uses the frequency of the self-excited oscillator circuit to determine the induction coil 51 position and control the moving mechanism 13. In the charging pad described above, the second position detection controller accurately determines the position of the induction coil from the oscillating frequency of the AC power source self-excited oscillator circuit. Therefore, this charging pad has the characteristic that induction coil position can be determined with precision by the second position detection controller.

In the device housing a battery and charging pad of the present invention, the position detection controller 44 can be provided with a plurality of position detection coils 30, a detection signal generating circuit 31 that supplies position detection signals to the position detection coils 30, a receiving circuit 32 that receives echo signals from the position detection coils 30 resulting from excitation of the induction coil 51 by position detection signals supplied to the position detection coils 30 from the detection signal generating circuit 31, and a discrimination circuit 43 that determines induction coil 51 position from the echo signals received by the receiving circuit 32. The discrimination circuit 43 can be provided with a memory circuit 47 to store the amplitude of the echo signal induced in each position detection coil 30 corresponding to a given induction coil 51 position. The discrimination circuit 43 can compare the amplitude of the echo signal induced in each position detection coil 30 with the amplitude of echo signals stored in the memory circuit 47 to determine the position of the induction coil 51.

In the device housing a battery and charging pad described above, the discrimination circuit compares the amplitude of the echo signal induced in each position detection coil with the amplitude of echo signals stored in the discrimination circuit memory circuit to determine the position of the induction coil. Consequently, the discrimination circuit can accurately determine the position of the induction coil from the amplitude of the echo signals induced in the position detection coils. This charging pad can accurately determine induction coil position with the position detection controller to rapidly move the power supply coil close to the induction coil and efficiently charge the internal battery.

In the device housing a battery and charging pad of the present invention, the top plate 21 of the case 20 can be made large enough to place a plurality of devices housing a battery 50. During charging of the battery 52 in a device housing a battery 50 where full-charge has not been reached, the position detection controller 14 can control the moving mechanism 13 to move the power supply coil 11 to the position of the induction coil 51 of another device housing a battery 50. Repetition of this action can fully charge each device housing a battery 50.

In the device housing a battery and charging pad described above, a battery in the next device housing a battery is charged before the battery previously being charged has reached full-charge. Since this procedure is repeated to charge the battery in a plurality of devices housing a battery, the charging time of each battery can be reduced, power transmitted from the power supply coil to the induction coil can be increased, and the plurality of devices housing a battery can be fully charged in a short time period. In particular, by switching the device housing a battery under charge, this system can increase the battery charging current to fully charge the battery rapidly while reducing induction coil and battery heating.

In the device housing a battery and charging pad of the present invention, the position detection controller 14 can detect at least one of the following data from the internal battery 52 being charged: battery voltage, battery remaining capacity, and battery temperature. Using the detected battery data, the position detection controller 14 can change the position of the power supply coil 11 to change the device housing a battery 50 under charge. Since this system changes the device housing a battery being charged based on battery data detected during charging, a battery can be fully charged rapidly while protecting the battery under charge.

In the device housing a battery and charging pad of the present invention, the top plate 21 can be translucent to allow the power supply coil 11 position to be visually confirmed from the outside. In this system, since close positioning of the power supply coil to the device housing a battery can be confirmed visually, the system can be used with confidence while reliably confirming device housing battery charging.

The device housing a battery and charging pad of the present invention can be provided with light emitting diodes (LEDs) to illuminate the power supply coil 11. Since the moving power supply coil and the vicinity around the power supply coil is brightly illuminated by the LEDs in this system, power supply coil movement can be clearly shown while achieving an aesthetically pleasing design.

The above and further objects of the present invention as well as the features thereof will become more apparent from the following detailed description to be made in conjunction with the accompanying drawings.

DETAILED DESCRIPTION OF THE EMBODIMENT(S)

The following describes embodiments of the present invention based on the figures.

Figure 1:
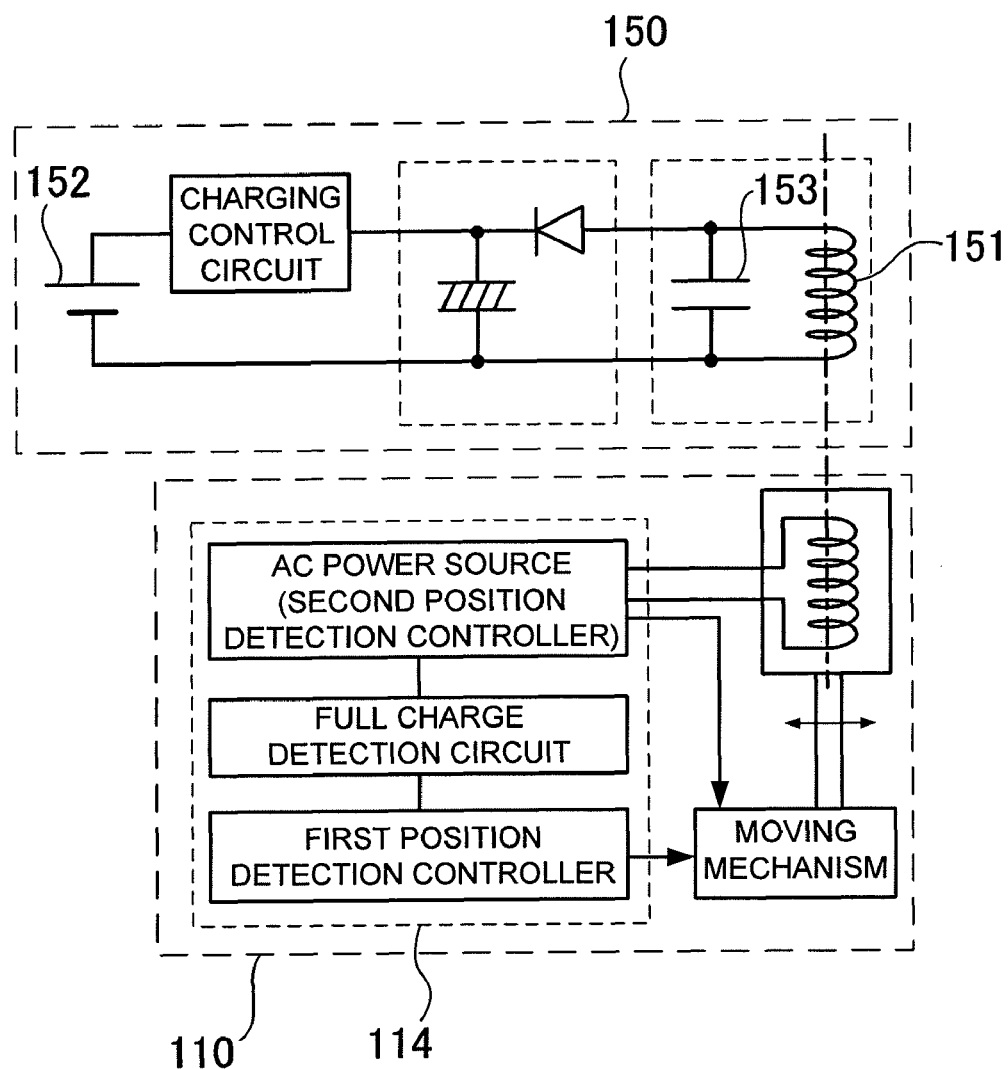
FIG. 1 is a block diagram of a device housing a battery and charging pad for a patent application previously submitted by the present applicant.
Figure 2:
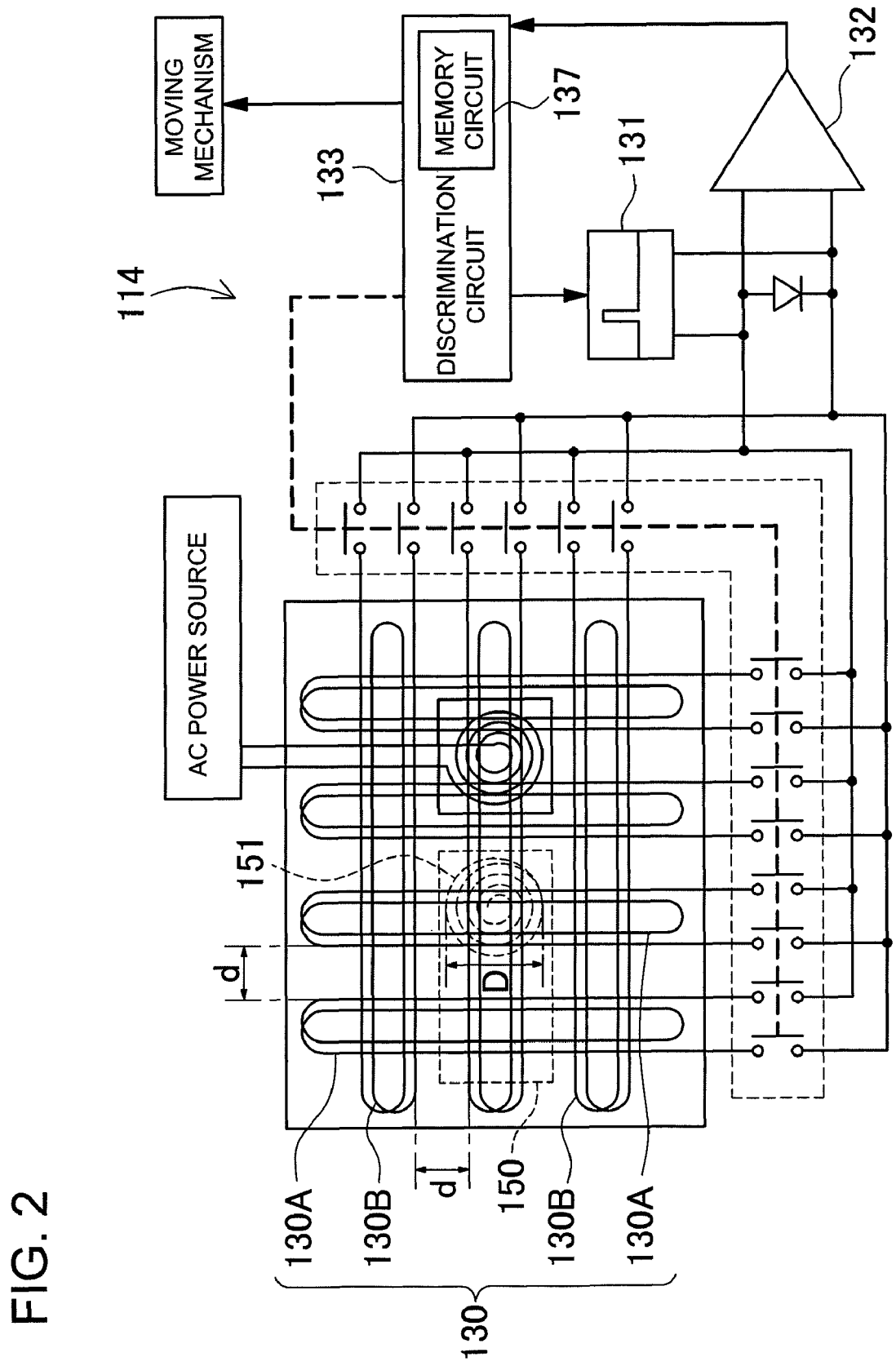
FIG. 2 is a circuit diagram showing the position detection controller of the charging pad shown in FIG. 1.
Figure 3:
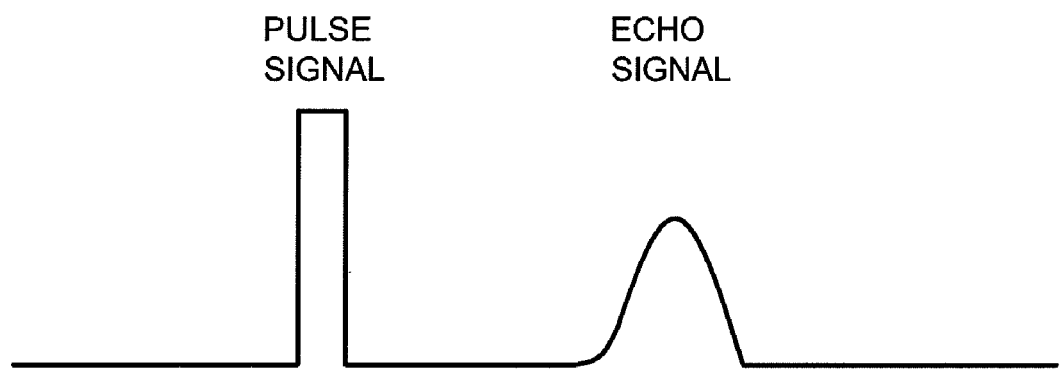
FIG. 3 is a waveform diagram showing an example of an echo signal output from the parallel resonant circuit due to pulse signal excitation of the induction coil and parallel capacitor of that resonant circuit.
Figure 4:
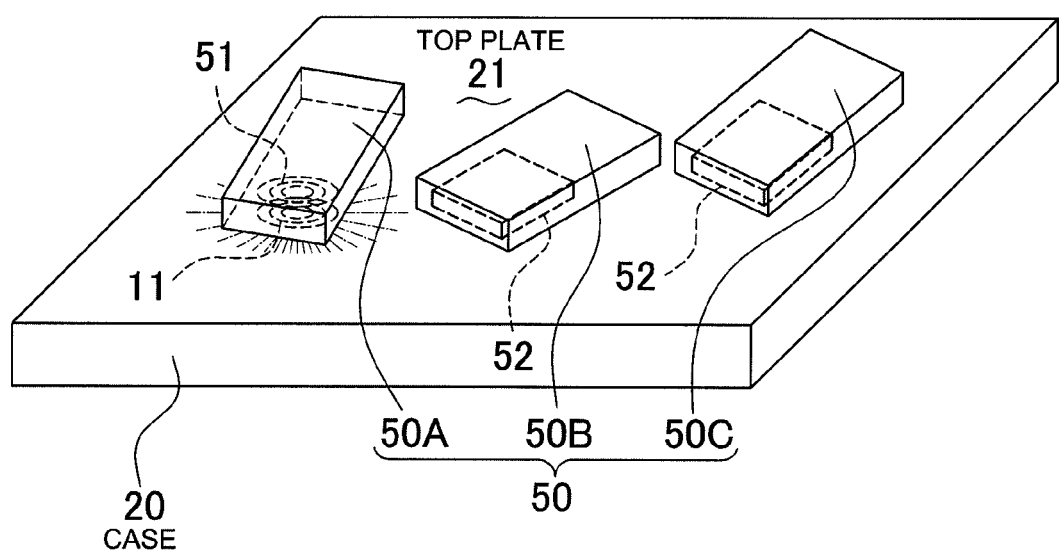
FIG. 4 is an oblique view of the charging pad for an embodiment of the present invention.
Figure 5:
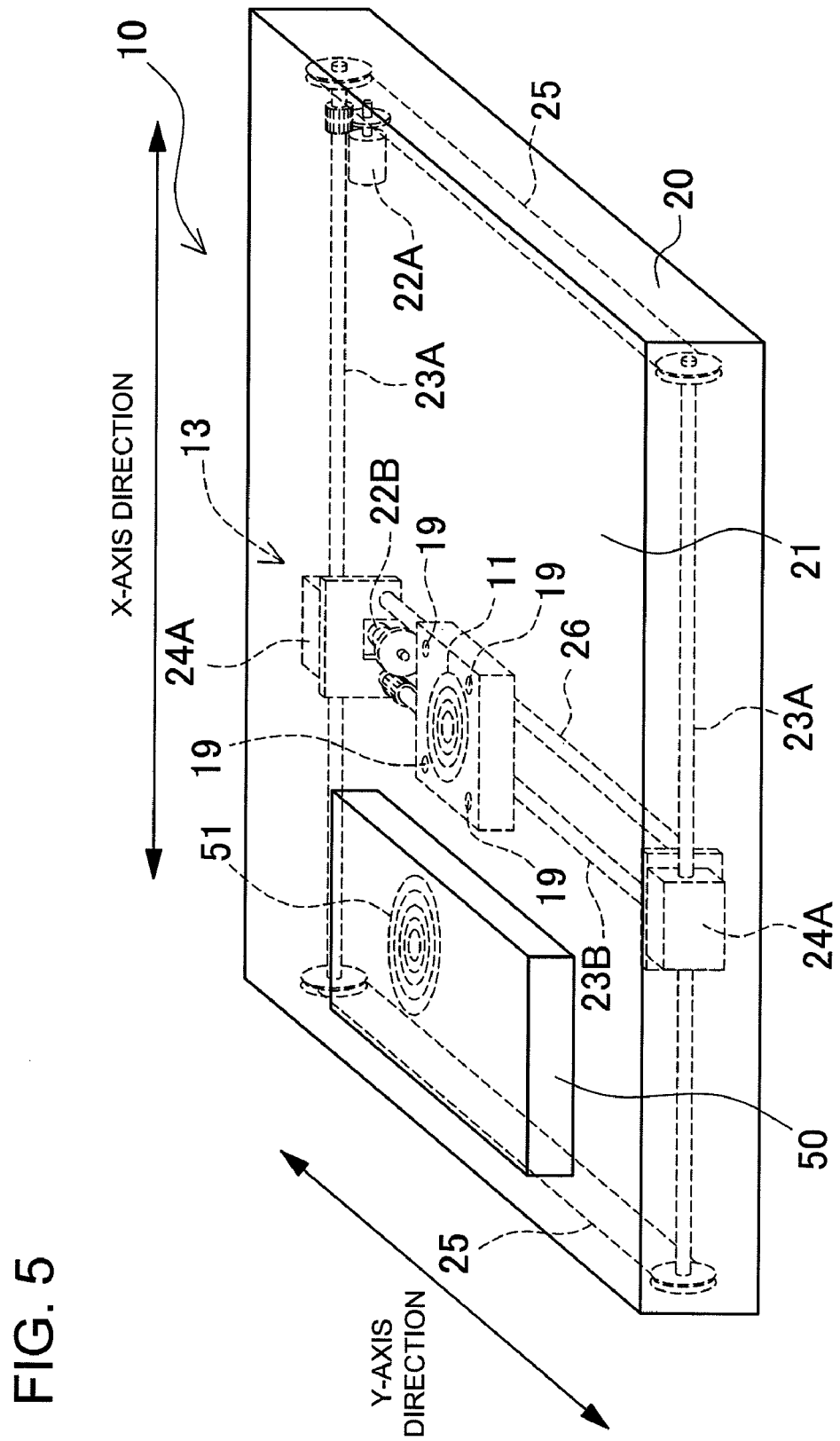
FIG. 5 is an abbreviated oblique view showing the internal structure of the charging pad shown in FIG. 4.
Figure 6:
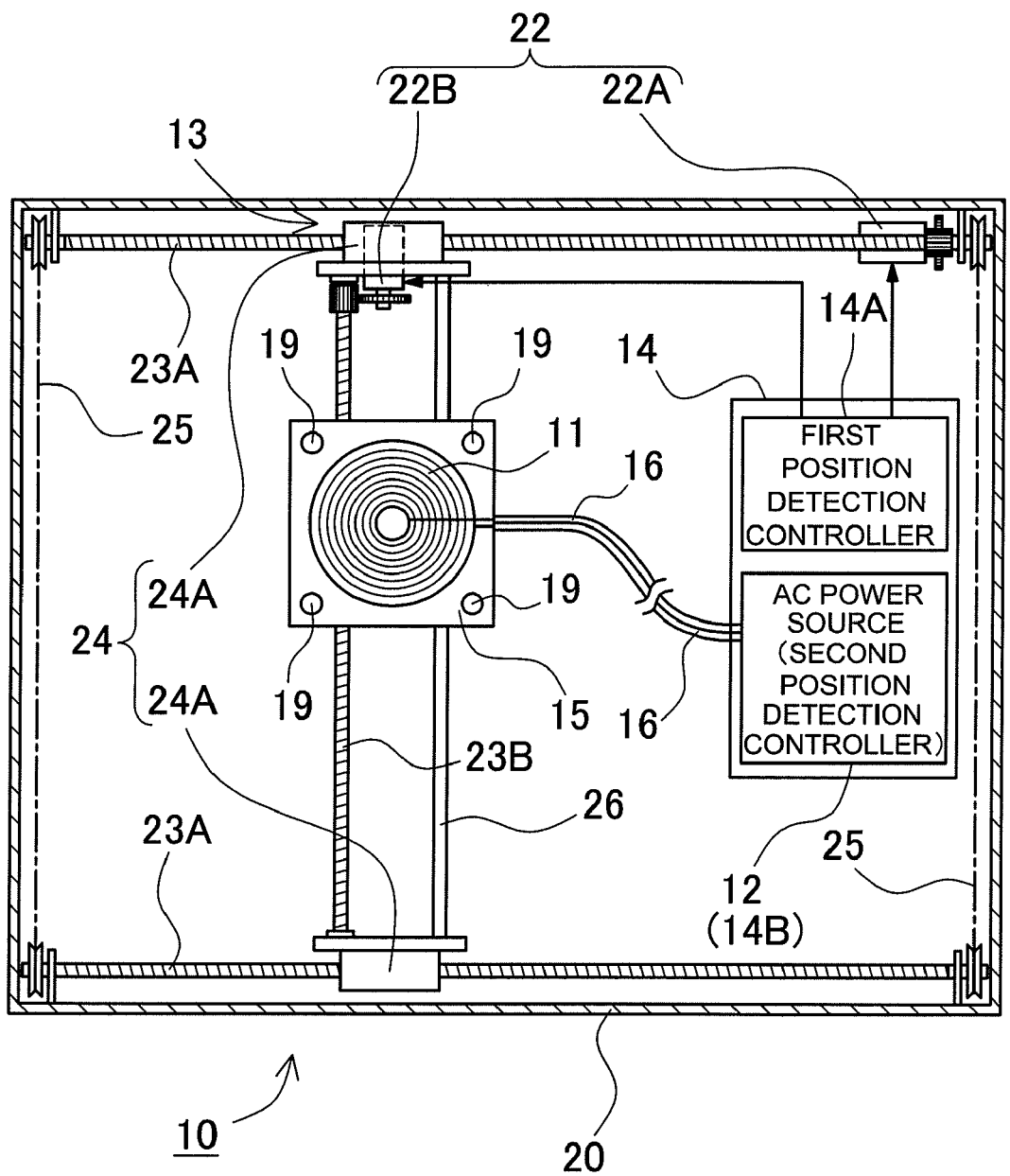
FIG. 6 is a horizontal cross-section view showing the internal structure of the charging pad shown in FIG. 4.
Figure 7:
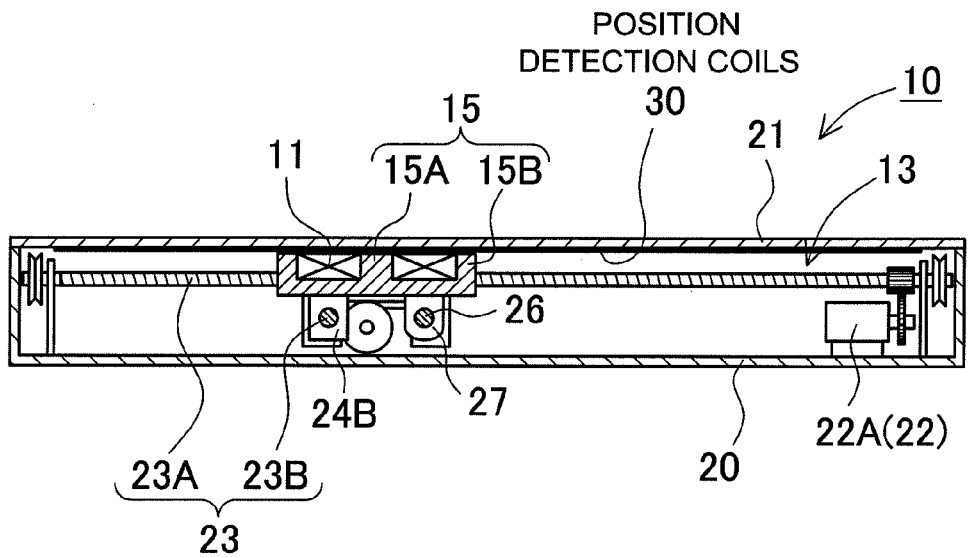
FIG. 7 is a lengthwise vertical cross-section view of the charging pad shown in FIG. 6
Figure 8:
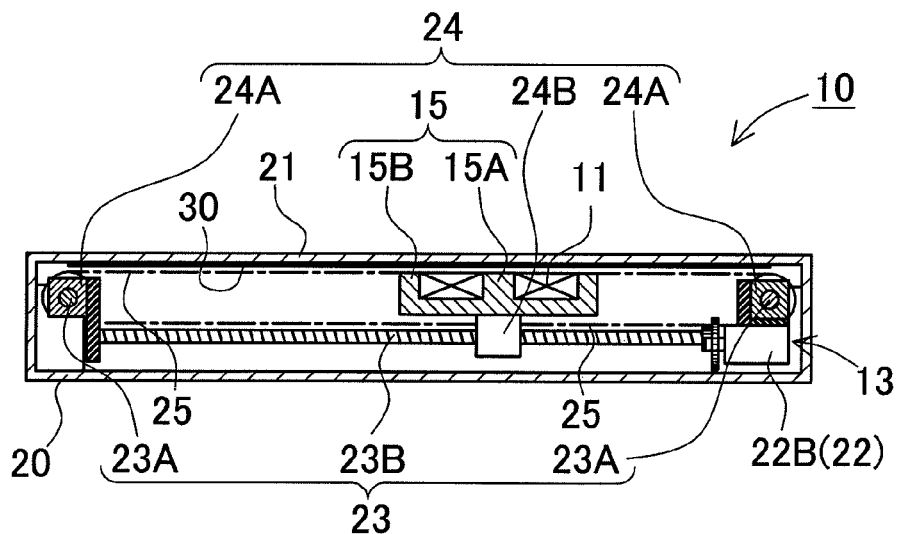
FIG. 8 is a widthwise vertical cross-section view of the charging pad shown in FIG. 6
Figure 9:
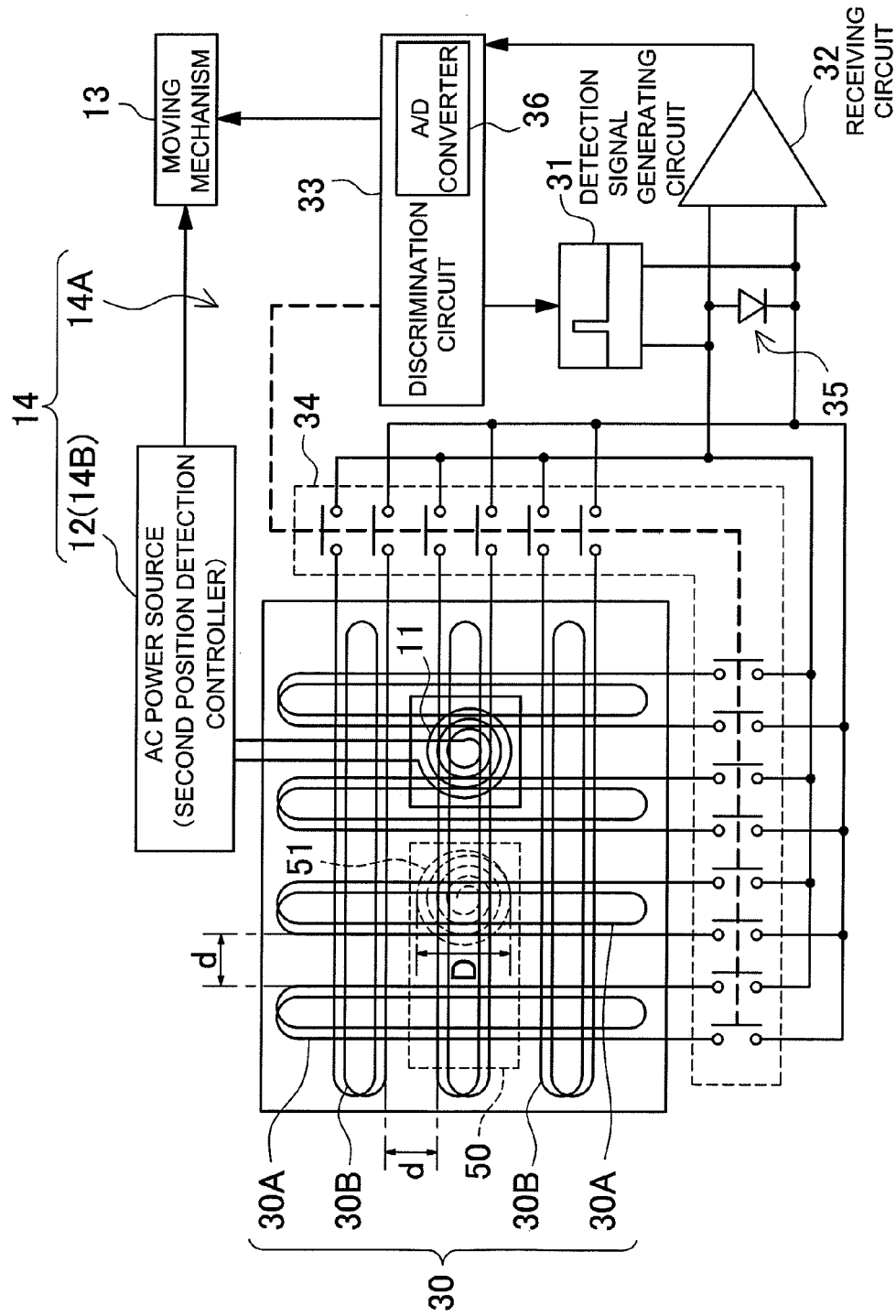
FIG. 9 is a circuit diagram showing the position detection controller of the charging pad for an embodiment of the present invention.
Figure 10:
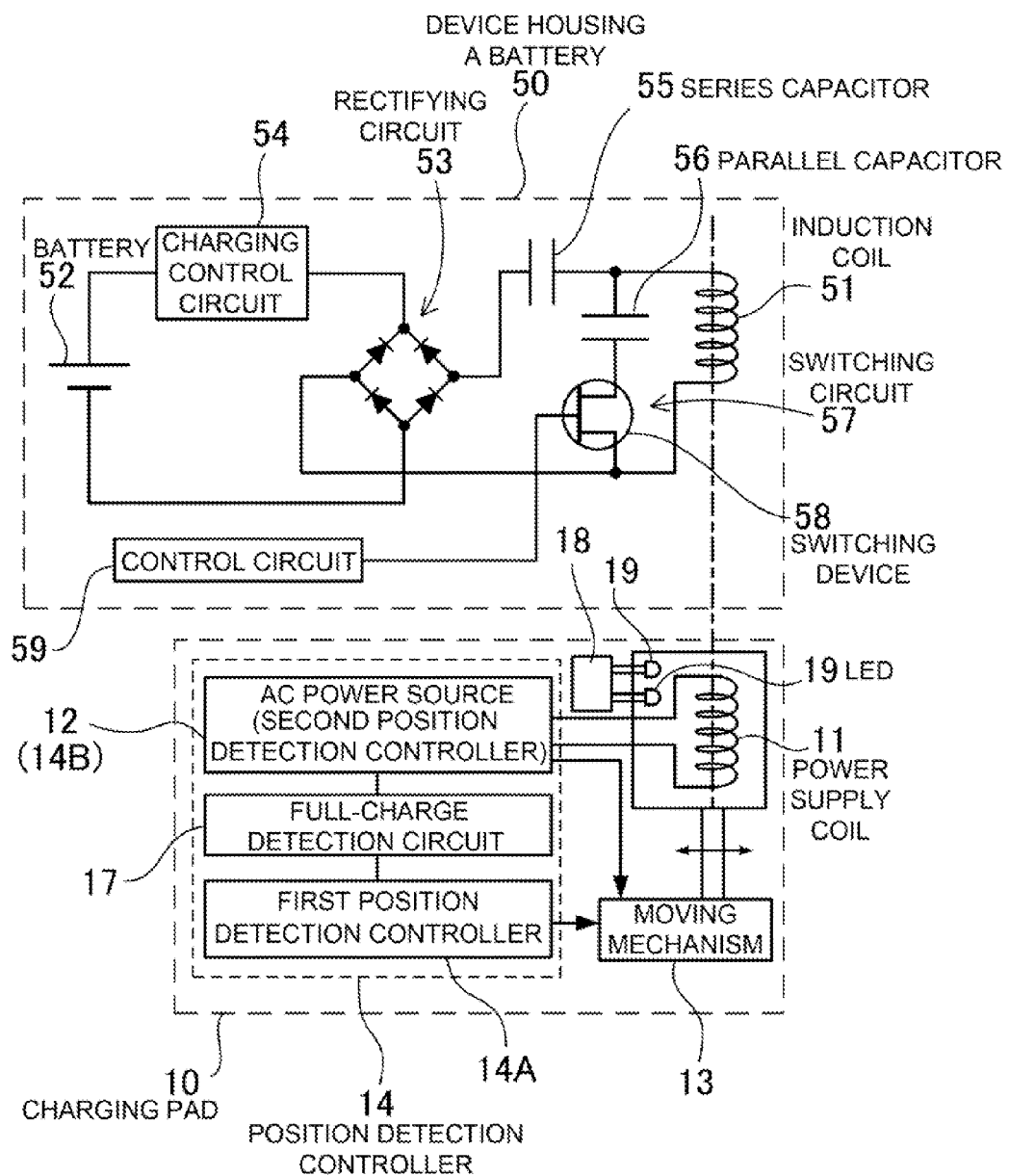
FIG. 10 is a block diagram of a device housing a battery and charging pad for an embodiment of the present invention.

FIGS. 4-10 are schematic and diagrammatic views illustrating the structure and operating principles of the charging pad 10. As shown in FIGS. 4, 5, and 10, devices housing a battery 50 are placed on the charging pad 10, and the internal battery 52 is charged utilizing magnetic induction. A device housing a battery 50 contains an induction coil 51 that magnetically couples with the power supply coil 11, and a battery 52 that is charged by power induced in the induction coil 51.

Figure 11:
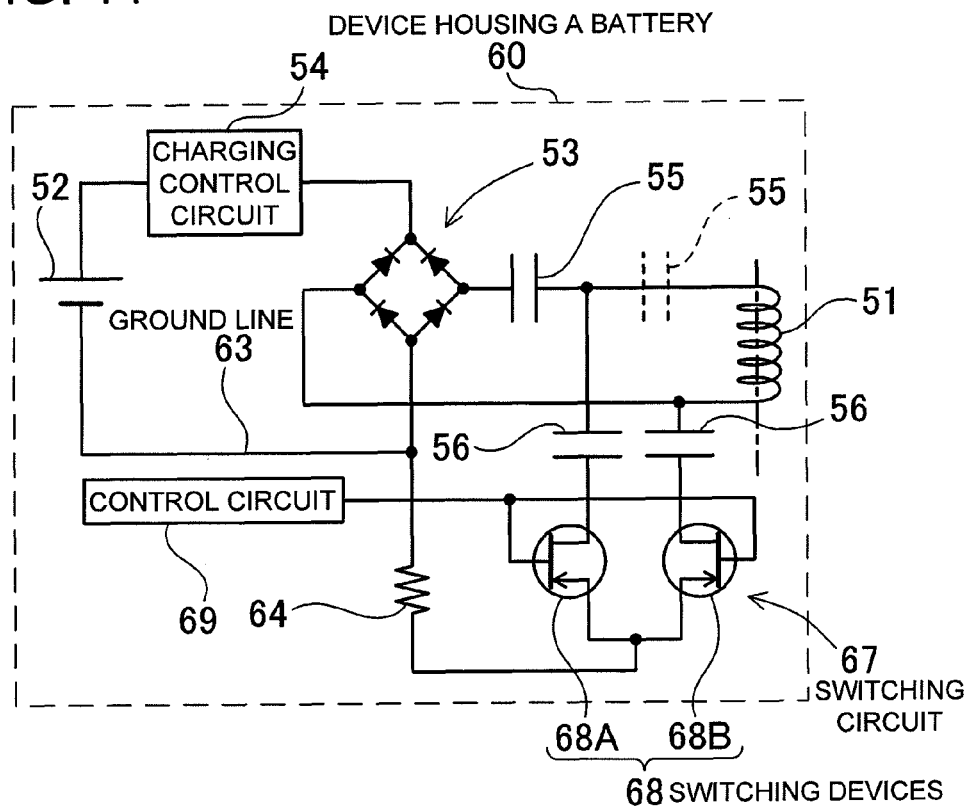
FIG. 11 is a block diagram showing another example of a device housing a battery.
Figure 12:
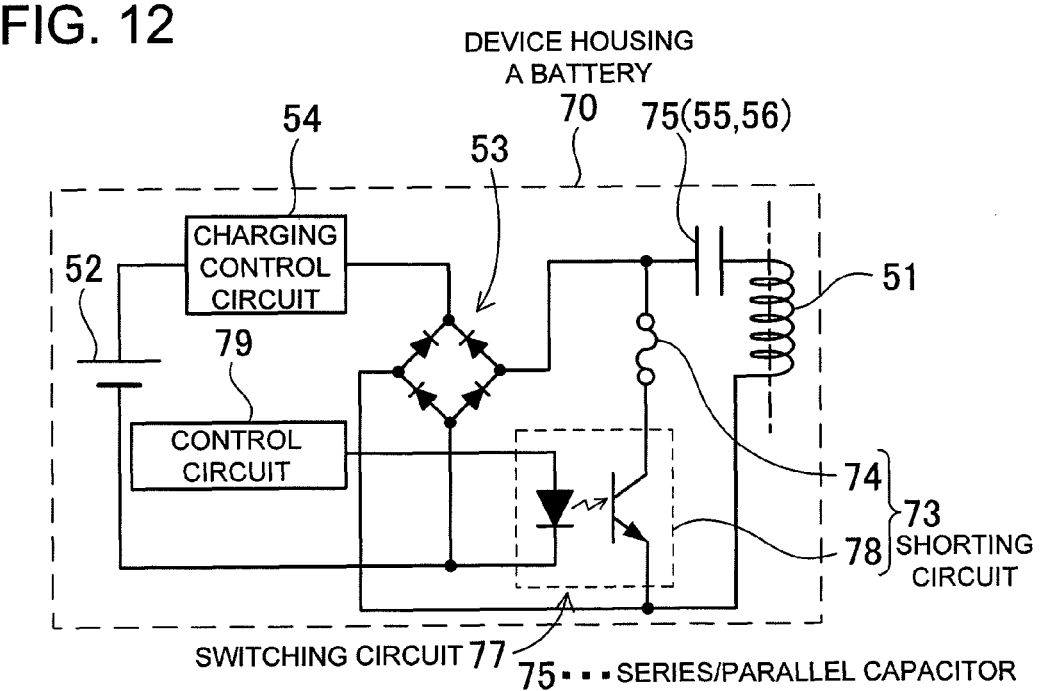
FIG. 12 is a block diagram showing another example of a device housing a battery.

FIGS. 10-12 show circuit diagrams of a device housing a battery 50, 60, 70. The device housing a battery 50, 60, 70 is provided with a rectifying circuit 53 connected to the induction coil 51 that converts AC induced in the induction coil 53 to DC to supply power to the internal battery 52. The rectifying circuit 53 converts AC input from the induction coil 51 to DC and outputs that DC power to a charging control circuit 54 that controls internal battery 52 charging. The charging control circuit 54 fully charges the internal battery 52 with power input from the rectifying circuit 53. The charging control circuit 54 detects full-charge of the internal battery 52 and stops charging. A charging control circuit 54 for a lithium ion internal battery 52 charges the battery 52 to full-charge by constant voltage-constant current charging. A charging control circuit for a nickel hydride internal battery charges the battery to full-charge by constant current charging.

Further, the device housing a battery 50, 60, 70 of FIGS. 10-12 is provided with a series capacitor 55 connected in series with the induction coil 51 to efficiently input induction coil 51 AC to the rectifying circuit 53, a parallel capacitor 56 connected in parallel with the induction coil 51, and a switching circuit 57, 67, 77 to switch connection of the series capacitor 55, the parallel capacitor 56, and the induction coil 51.

When position detection signals are output from the position detection controller 14, the switching circuit 57, 67, 77 connects the parallel capacitor 56 to the induction coil 51. The induction coil 51 and parallel capacitor 56 form a parallel resonant circuit that is excited by position detection signals issued from the position detection controller 14 position detection coils 30 to generate echo signals. Resonance resulting in echo signal generation cannot be achieved by induction coil 51 connection to a series capacitor 55 alone, and connection of a parallel capacitor is necessary. Therefore, when the device housing a battery 50, 60, 70 is placed on the charging pad 10 and the position detection controller 14 is determining the position of the device housing a battery 50, 60, 70, the switching circuit 57, 67, 77 connects the parallel capacitor 56 to the induction coil 51.

However, an induction coil 51 connected to a parallel capacitor 56 has the drawback that power efficiency is reduced because the induced power cannot be efficiently output to the rectifying circuit 53. The power efficiency of power transferred from the induction coil 51 to the rectifying circuit 53 is improved with connection of a series capacitor 55 compared to a parallel capacitor 56. Consequently, after the induction coil 51 position has been detected and the power supply coil 11 has been moved close to the induction coil 51, the switching circuit 57, 67, 77 connects the series capacitor 55 to the induction coil 51 to output induced power from the induction coil 51 to the rectifying circuit 53. Specifically, when the power supply coil 11 transmits power to the induction coil 51, the switching circuit 57, 67, 77 disconnects the parallel capacitor 56 from the induction coil 51 to leave the series capacitor 55 connected instead. In this configuration, AC induced in the induction coil 51 is output to the rectifying circuit 55 through the series capacitor 55.

The switching circuit 57 shown in FIG. 10 is provided with a switching device 58 connected in series with the parallel capacitor 56. The series-connected parallel capacitor 56 and switching device 58 are connected in parallel with the induction coil 51. The switching device 58 is a semiconductor switching device such as a FET that is controlled ON and OFF by a control circuit 59. When the switching circuit 57 switching device 58 is in the ON state, the parallel capacitor 56 is connected in parallel with the induction coil 51. When the switching device 58 is in the OFF state, the parallel capacitor 56 is disconnected from the induction coil 51. The series capacitor 55 is connected in series with the induction coil 51 and connects the induction coil 51 to the rectifying circuit 53.

The control circuit 59 controls the gate voltage of the FET, which is the switching device 58, to switch the switching device 58 ON and OFF. When the position of the induction coil 51 is being detected, the control circuit 59 holds the switching device 58 in the ON state to connect the parallel capacitor 56 to the induction coil 51. The induction coil 51 connected in parallel with the parallel capacitor 56 outputs a large amplitude echo signal when excited by a position detection signal from a position detection coil 30. Even with the switching device 58 in the ON state, the series capacitor 55 is connected between the induction coil 51 and the rectifying circuit 53. However, with the switching device 58 in the ON state, the induction coil 51 is connected in parallel with the parallel capacitor 56 to establish a parallel resonant circuit that outputs a large amplitude echo signal when excited by a position detection signal.

After the induction coil 51 position has been detected and the power supply coil 11 has been moved close to the induction coil 51, the control circuit 59 switches the switching device 58 OFF to disconnect the parallel capacitor 56 from the induction coil 51. Specifically, when power is transmitted from the power supply coil 11 to the induction coil 51, the control circuit 59 holds the switching device 58 in the OFF state to disconnect the parallel capacitor 56 from the induction coil 51. In this configuration, AC power induced in the induction coil 51 is efficiently output to the rectifying circuit 53 through the series capacitor 55.

The switching circuit 67 of FIG. 11 is provided with a pair of switching devices 68 that are connected in series. The two switching devices 68 of the figure are semiconductor switching devices such as FETs. The pair of FETs 68A, 68B have their sources connected together to connect the devices in series. In addition, the connection node of the pair of switching devices 68, which is the sources of the two FETs, is connected to the ground line 63 through a high resistance resistor 64 (for example, 100KΩ) to put the connection node essentially at ground potential. A parallel capacitor 56 is connected in series with each of the two switching devices 68. Each of the FETs 68A, 68B, which are the pair of switching devices 68, is connected to an end of the induction coil 51 through a drain-connected parallel capacitor 56. The switching circuit 67 of this figure connects the series-connection of a parallel capacitor 56, FET 68A, FET 68B, and another parallel capacitor 56 in parallel with the induction coil 51.

The series capacitor 55 can be connected on the rectifying circuit 53 side of the parallel capacitor 56 as shown by the solid lines of the figure, or as shown by the broken lines, it can also be connected between the parallel capacitor 56 and the induction coil 51. A series capacitor 55 connected between the parallel capacitor 56 and the induction coil 51 is connected in series with the parallel capacitor 56 when the switching devices 68 are in the ON state. Consequently, the total capacitance connected to the induction coil 51 to form the parallel resonant circuit is equivalent to the series combination of the series capacitor 55 and the two parallel capacitors 56.

The two FETs 68A, 68B of the pair of switching devices 68 are switched ON and OFF together by the control circuit 69. The control circuit 69 controls the gate voltages of both FETs in the same manner to simultaneously switch the pair of switching devices 68ON and OFF. The control circuit 69 connects the parallel capacitors 56 in parallel with the induction coil 51 by switching the pair of FET switching devices 68 to the ON state. When the control circuit 69 switches the pair of switching devices 68 to the OFF state, the parallel capacitors 56 are disconnected from the induction coil 51.

When the position of the induction coil 51 is being detected, the control circuit 69 described above holds the pair of switching devices 68 in the ON state to connect the parallel capacitors 56 to the induction coil 51. The induction coil 51 connected in parallel with the parallel capacitors 56 outputs an echo signal when excited into parallel resonance by a position detection signal from a position detection coil 30.

After the induction coil 51 position has been detected and the power supply coil 11 has been moved close to the induction coil 51, the control circuit 69 switches the pair of switching devices 68 OFF to disconnect the parallel capacitors 56 from the induction coil 51. Specifically, when power is transmitted from the power supply coil 11 to the induction coil 51, the control circuit 69 holds the pair of switching devices 68 in the OFF state to disconnect the parallel capacitors 56 from the induction coil 51. In this configuration, AC power induced in the induction coil 51 is efficiently output to the rectifying circuit 53 through the series capacitor 55.

In the switching circuit 67 of FIG. 11, since one end of the pair of switching devices 68 is essentially at ground, the circuit structure of the control circuit 69 can be simplified. In particular, when the rectifying circuit 53 is a diode bridge, neither end of the induction coil 51 is at ground potential. Specifically, the induction coil 51 is connected to the ground line 63 through the diodes. In this case, the circuit structure of the control circuit 69 that controls the pair of switching devices 68ON and OFF can be simplified.

Further, the device housing a battery 70 of FIG. 12 has a series capacitor 55 and parallel capacitor 56 that are a single series/parallel capacitor 75. In this device housing a battery 70, the switching circuit 77 switches the series/parallel capacitor 75 to use it as a series capacitor 55 or as a parallel capacitor 56. The series/parallel capacitor 75 is connected between the induction coil 51 and the rectifying circuit 53. The switching circuit 77 is a shorting circuit 73 that short circuits the rectifying circuit 53 side of the series/parallel capacitor 75. The shorting circuit 73 is made up of a resistance device 74 such as a positive temperature coefficient (PCT) thermistor and a switching device 78, and the switching device 78 is controlled ON and OFF by a control circuit 79. The switching device 78 is a phototransistor such as photo MOS-FET that is switched ON and OFF via light. When the control circuit 79 switches the switching device 78ON, the shorting circuit 73 short circuits the rectifying circuit 53 side of the series/parallel capacitor 75 to connect the series/parallel capacitor 75 in parallel with the induction coil 51. When the control circuit 79 switches the switching device 78 OFF, the shorting circuit 73 is not short circuited but rather is open circuited. This connects the series/parallel capacitor 75 in series with the rectifying circuit 53 to output induction coil 51 AC power to the rectifying circuit 53 through the series/parallel capacitor 75.

As shown in FIGS. 4-10, the charging pad 10 is provided with a power supply coil 11 connected to the AC power source 12 to induce electromotive force (EMF) in the induction coil 51, a case 20 housing the power supply coil 11 and having a top plate 21 to place a device housing a battery 50, a moving mechanism 13 housed in the case 20 to move the power supply coil 11 along the inside surface of the top plate 21, and a position detection controller 14 that detects the position of a device housing a battery 50 placed on the top plate 21 and controls the moving mechanism 13 to move the power supply coil 11 close to the induction coil 51 of the device housing a battery 50. The power supply coil 11, AC power source 12, moving mechanism 13, and position detection controller 14 are housed inside the case 20.

The charging pad 10 charges the battery 52 inside a device housing a battery 50 in the following manner.

(1) When a device housing a battery 50 is placed on the top plate 21 of the case 20, the position detection controller 14 detects its position.

(2) The position detection controller 14, which has detected the position of the device housing a battery 50, controls the moving mechanism 13 to move the power supply coil 11 along the inside of the top plate 21 and position it in close proximity to the induction coil 51 of the device housing a battery 50.

(3) The power supply coil 11, which has been moved close to the induction coil 51, is magnetically coupled to the induction coil 51 and transmits AC power to the induction coil 51.

(4) The device housing a battery 50 converts the induction coil 51 AC power to DC and charges the internal battery 52 with that DC power.

The charging pad 10, which charges the battery 52 in a device housing a battery 50 by the procedure described above, houses the power supply coil 11 connected to the AC power source 12 inside the case 20. The power supply coil 11 is disposed beneath the top plate 21 of the case 20 in a manner that allows it to move along the inside of the top plate 21. The efficiency of power transmission from the power supply coil 11 to the induction coil 51 is improved by narrowing the gap between the power supply coil 11 and the induction coil 51. With the power supply coil 11 moved into close proximity with the induction coil 51, the gap between the power supply coil 11 and the induction coil 51 is preferably less than or equal to 7 mm. Therefore, the power supply coil 11 is disposed under the top plate 21 and positioned as close as possible to the top plate 21. Since the power supply coil 11 is moved close to the induction coil 51 of a device housing a battery 50 placed on the top plate 21, the power supply coil 11 is disposed in a manner that allows it to move along the inside surface of the top plate 21.

The case 20 that houses the power supply coil 11 is provided with a planar top plate 21 where a device housing a battery 50 can be placed. The charging pad 10 of FIGS. 4 and 5 has an overall planar top plate 21 that is disposed horizontally. The top plate 21 is made large enough to allow placement of devices housing a battery 50 having different sizes and shapes. For example, the top plate 21 can have a rectangular shape with a side having a length of 5 cm to 30 cm. However, the top plate 21 can also have a circular shape with a diameter of 5 cm to 30 cm. The charging pad 10 of FIGS. 4 and 5 has a large top plate 21 that allows simultaneous placement of a plurality of devices housing a battery 50. Here, a plurality of devices housing a battery 50 is placed on the top plate 21 at the same time to allow sequential charging of their internal batteries 52. Further, the top plate can also be provided with side-walls or other barriers around its perimeter, and devices housing a battery can be placed inside the side-walls to charge the internal batteries.

The top plate 21 of the case 20 is translucent to allow visual confirmation of the internal movement of the power supply coil 11 from the outside. Since the user can visually confirm that the power supply coil 11 is in close proximity to the device housing a battery 50, the user can dependably confirm charging of the device housing a battery 50. As a result, the user can operate the charging pad 10 with confidence. Further, LEDs 19 can be provided to illuminate the moving power supply coil 11 and its vicinity. This can accentuate power supply coil 11 movement and create an aesthetically pleasing design. In addition, the LEDs 19 can be configured to shine through the top plate 21 to illuminate the device housing a battery 50. The charging pad 10 shown in FIGS. 5 and 6 has four LEDs 19 disposed at equal intervals around the power supply coil 11. As shown in FIG. 10, these LEDs 19 are energized by power supplied from a DC power supply 18 housed in the charging pad 10. However, LEDs can also be disposed at the center region of the power supply coil. In addition, the number of LEDs used to show the power supply coil position can be three or less, or five or more. With this charging pad 10, the device housing a battery 50 can be illuminated during charging, or visual effects such as the color or blinking pattern of the LEDs 19 can be changed during charging. This type of charging pad 10 can clearly indicate to the user the state of charging of a device housing a battery 50.

The power supply coil 11 is wound in a plane parallel to the top plate 21, and radiates AC magnetic flux above the top plate 21. This power supply coil 11 emits AC magnetic flux perpendicular to, and beyond the top plate 21. The power supply coil 11 is supplied with AC power from the AC power source 12 and radiates AC magnetic flux above the top plate 21. Wire can be wound around a magnetic material core 15 to make a power supply coil 11 with high inductance. The core 15 is magnetic material with a high magnetic permeability such as ferrite and has the shape of an open end container. The core 15 has a solid circular cylinder 15A at the center of the spiral wound power supply coil 11 and a circular cylindrical enclosure 15B around the outside that are joined by a bottom section (refer to FIGS. 7 and 8). A power supply coil 11 with a core 15 can focus magnetic flux in a specific region to efficiently transmit power to the induction coil 51. However, a magnetic material core is not always required in the power supply coil, and a coil with no core can also be used. Since a coil with no core is light, the moving mechanism that moves the power supply coil inside the top plate can be simplified. The power supply coil 11 is made with essentially the same outside diameter as the induction coil 51 to efficiently transmit power to the induction coil 51.

The AC power source 12 supplies high frequency power, for example 20 kHz to several MHz, to the power supply coil 11. The AC power source 12 is connected to the power supply coil 11 via flexible lead wires 16. This is because the power supply coil 11 has to be moved close to the devices housing a battery 50 that are placed on the top plate 21. Although not illustrated, the AC power source 12 is provided with a self-excited oscillator circuit, and a power amplifier to amplify the AC power output from the self-excited oscillator circuit. The self-excited oscillator circuit uses the power supply coil 11 as an oscillator circuit inductor. Consequently, the oscillator frequency changes with the inductance of the power supply coil 11. The inductance of the power supply coil 11 changes with the relative position of the power supply coil 11 with respect to the induction coil 51. This is because the mutual inductance of the power supply coil 11 and the induction coil 51 changes with the relative position of the power supply coil 11 with respect to the induction coil 51. Therefore, the frequency of the self-excited oscillator circuit, which uses the power supply coil 11 as an oscillator circuit inductor, changes as the power supply coil 11 approaches the induction coil 51. As a result, the self-excited oscillator circuit can detect the relative position of the power supply coil 11 with respect to the induction coil 51 from the change in oscillating frequency, and can be used with the dual purpose as a position detection controller 14.

The power supply coil 11 is moved in close proximity to the induction coil 51 by the moving mechanism 13. The moving mechanism 13 of FIGS. 5-8 moves the power supply coil 11 along the inside of the top plate 21 in the X-axis and Y-axis directions to position it close to the induction coil 51. The moving mechanism 13 of the figures rotates threaded rods 23 via servo motors 22 controlled by the position detection controller 14 to move nut blocks 24 that are threaded onto the threaded rods 23. The nut blocks 24 are moved to move the power supply coil 11 close to the induction coil 51. The servo motors 22 are provided with an X-axis servo motor 22A to move the power supply coil 11 in the X-axis direction, and a Y-axis servo motor 22B to move the power supply coil 11 in the Y-axis direction. The threaded rods 23 are provided with a pair of X-axis threaded rods 23A to move the power supply coil 11 in the X-axis direction, and a Y-axis threaded rod 23B to move the power supply coil 11 in the Y-axis direction. The pair of X-axis threaded rods 23A are disposed parallel to each other, and are connected via belts 25 to rotate together when driven by the X-axis servo motor 22A. The threaded nut blocks 24 are provided with a pair of X-axis nut blocks 24A that are threaded onto each X-axis threaded rod 23A, and a Y-axis nut block 24B that is threaded onto the Y-axis threaded rod 23B. Both ends of the Y-axis threaded rod 23B are connected to the X-axis nut blocks 24A in a manner allowing rotation. The power supply coil 11 is mounted on the Y-axis nut block 24B.

Further, the moving mechanism 13 of the figures has a guide rod 26 disposed parallel to the Y-axis threaded rod 23B to move the power supply coil 11 in the Y-axis direction while retaining it in a horizontal orientation. The guide rod 26 is connected at both ends to the X-axis nut blocks 24A and moves together with the pair of X-axis nut blocks 24A. The guide rod 26 passes through a guide block 27 attached to the power supply coil 11 to allow power supply coil 11 movement along the guide rod 26 in the Y-axis direction. Specifically, the power supply coil 11 is moved with horizontal orientation in the Y-axis direction via the Y-axis nut block 24B and guide block 27 that move along the parallel disposed Y-axis threaded rod 23B and guide rod 26.

When the X-axis servo motor 22A rotates the X-axis threaded rods 23A of this moving mechanism 13, the pair of X-axis nut blocks 24A move along the X-axis threaded rods 23A to move the Y-axis threaded rod 23B and the guide rod 26 in the X-axis direction. When the Y-axis servo motor 22B rotates the Y-axis threaded rod 23B, the Y-axis nut block 24B moves along the Y-axis threaded rod 23B to move the power supply coil 11 in the Y-axis direction. Here, the guide block 27 attached to the power supply coil 11 moves along the guide rod 26 to maintain the power supply coil 11 in a horizontal orientation during movement in the Y-axis direction. Consequently, rotation of the X-axis servo motor 22A and Y-axis servo motor 22B can be controlled by the position detection controller 14 to move the power supply coil 11 in the X-axis and Y-axis directions. However, the charging pad of the present invention is not limited to a moving mechanism with the configuration described above. This is because any configuration of moving mechanism can be used that can move the power supply coil in the X-axis and Y-axis directions.

Further, the charging pad of the present invention is not limited to a moving mechanism that moves the power supply coil in the X-axis and Y-axis directions. This is because the charging pad of the present invention can be provided with a straight-line guide wall on the top plate, the devices housing a battery can be aligned along the guide wall, and the power supply coil can be moved in a straight-line along the guide wall. Although not illustrated, this charging pad can move the power supply coil in a straight-line along the guide wall with a moving mechanism that moves the power supply coil in one direction such as in the X-axis direction only.

The position detection controller 14 detects the position of a device housing a battery 50 that is placed on the top plate 21. The position detection controller 14 of FIGS. 5-8 detects the position of the induction coil 51 housed in the device housing a battery 50, and moves the power supply coil 11 close to the induction coil 51. Further, the position detection controller 14 is provided with a first position detection controller 14A that roughly determines the position of the induction coil 51, and a second position detection controller 14B that determines the position of the induction coil 51 with precision. In this position detection controller 14, the first position detection controller 14A roughly determines the position of the induction coil 51 and controls the moving mechanism 13 to move the power supply coil 11 close to the induction coil 51. Subsequently, the second position detection controller 14B detects the induction coil 51 position with precision while controlling the moving mechanism 13 to move the power supply coil 11 more accurately to the position of the induction coil 51. This charging pad 10 can quickly move the power supply coil 11 close to the induction coil 51 with precision.

As shown in FIG. 9, the first position detection controller 14A is provided with a plurality of position detection coils 30 fixed to the inside of the top plate 21, a detection signal generating circuit 31 that supplies position detection signals to the position detection coils 30, a receiving circuit 32 that receives echo signals from the position detection coils 30 resulting from excitation of the induction coil 51 by position detection signals supplied to the position detection coils 30 from the detection signal generating circuit 31, and a discrimination circuit 33 that determines induction coil 51 position from the echo signals received by the receiving circuit 32.

The position detection coils 30 are made up of a plurality of coils in rows and columns. The plurality of position detection coils 30 is fixed with specified intervals between each coil on the inside surface of the top plate 21. The position detection coils 30 are provided with a plurality of X-axis detection coils 30A that detect induction coil 51 position on the X-axis, and a plurality of Y-axis detection coils 30B that detect induction coil 51 position on the Y-axis. Each X-axis detection coil 30A is a long narrow loop extending in the Y-axis direction, and the X-axis detection coils 30A are fixed to the inside of the top plate 21 at specified intervals. The interval (d) between adjacent X-axis detection coils 30A is smaller than the outside diameter (D) of the induction coil 51, and preferably the interval (d) between X-axis detection coils 30A is from 1 times to ¼ times the induction coil 51 outside diameter (D). The position of the induction coil 51 on the X-axis can be detected more accurately by reducing the interval (d) between X-axis detection coils 30A. Each Y-axis detection coil 30B is a long narrow loop extending in the X-axis direction, and the Y-axis detection coils 30B are also fixed to the inside of the top plate 21 at specified intervals. In the same manner as the X-axis detection coils 30A, the interval (d) between adjacent Y-axis detection coils 30B is smaller than the outside diameter (D) of the induction coil 51, and preferably the interval (d) between Y-axis detection coils 30B is from 1 times to ¼ times the induction coil 51 outside diameter (D). The position of the induction coil 51 on the Y-axis can also be detected more accurately by reducing the interval (d) between Y-axis detection coils 30B.

Figure 13:
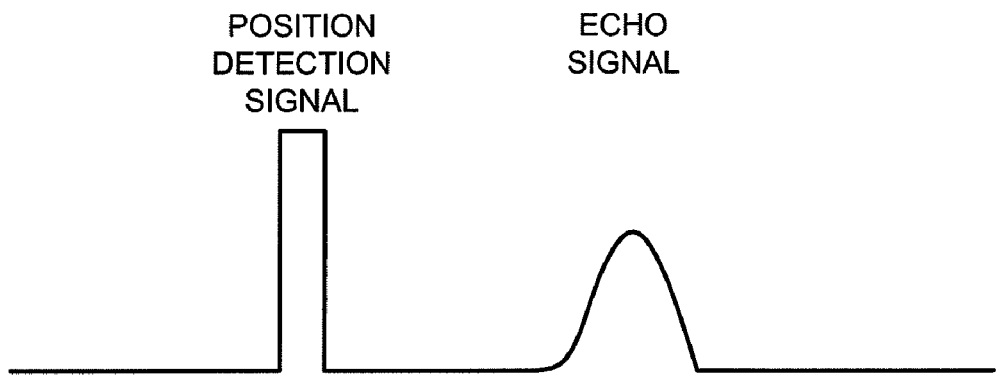
FIG. 13 is a waveform diagram showing an example of an echo signal output from the parallel resonant circuit due to position detection signal excitation of the induction coil and parallel capacitor of that resonant circuit.

The detection signal generating circuit 31 issues pulse signals, which are the position detection signals, with a specified timing. A position detection coil 30, which has input a position detection signal, excites a nearby induction coil 51 via the position detection signal. The induction coil 51, which has been excited by a position detection signal, outputs an echo signal, which is generated by the energy of the induced current flow, and that echo signal is detected by the position detection coil 30. Specifically, as shown in FIG. 13, following a given delay time after a position detection signal has been input, the induction coil 51 generates an echo signal, and that echo signal is induced in the position detection coil 30 near the induction coil 51. The echo signal induced in the position detection coil 30 is sent from the receiving circuit 32 to the discrimination circuit 33. The discrimination circuit 33 uses the echo signal input from the receiving circuit 32 to determine if the induction coil 51 is close to the position detection coil 30. When echo signals are induced in a plurality of position detection coils 30, the discrimination circuit 33 determines that the position detection coil 30 with the largest amplitude echo signal is closest to the induction coil 51.

The position detection controller 14 shown in FIG. 9 connects each position detection coil 30 to the receiving circuit 32 via a switching matrix 34. Since this position detection controller 14 can connect a plurality of position detection coils 30 by sequential switching, echo signals from a plurality of position detection coils 30 can be detected with one receiving circuit 32. However, a receiving circuit can also be connected to each position detection coil to detect the echo signals.

In the position detection controller 14 of FIG. 9, the discrimination circuit 33 controls the switching matrix 34 to sequentially switch each of the position detection coils 30 for connection to the receiving circuit 32. Since the detection signal generating circuit 31 is connected outside the switching matrix 34, it outputs position detection signals to each position detection coil 30. The amplitude of the position detection signals output from the detection signal generating circuit 31 to the position detection coils 30 is extremely large compared to the echo signals from the induction coil 51. The receiving circuit 32 has a diode connected to its input-side that forms a voltage limiting circuit 35. Position detection signals input to the receiving circuit 32 from the detection signal generating circuit 31 are voltage limited by the limiting circuit 35. Low amplitude echo signals are input to the receiving circuit 32 without voltage limiting. The receiving circuit 32 amplifies and outputs both position detection signals and the echo signals. An echo signal output from the receiving circuit 32 is a signal that is delayed from the position detection signal by a given delay time such as several μsec to several hundred μsec. Since the echo signal delay time from the position detection signal is constant, a signal received after the constant delay time is assumed to be an echo signal, and the proximity of a position detection coil 30 to the induction coil 51 is determined from the amplitude of that echo signal.

The receiving circuit 32 is an amplifier that amplifies echo signals input from the position detection coils 30. The receiving circuit 32 outputs each position detection signal and echo signal. The discrimination circuit 33 determines if the induction coil 51 is placed next to a position detection coil 30 from the position detection signal and echo signal input from the receiving circuit 32. The discrimination circuit 33 is provided with an analog-to-digital (A/D) converter 36 to convert the signals input from the receiving circuit 32 to digital signals. Digital signals output from the A/D converter 36 are processed to detect the echo signals. The discrimination circuit 33 detects a signal that is delayed from the position detection signal by a given delay time as an echo signal, and determines if the induction coil 51 is close to the position detection coil 30 from the amplitude of the echo signal.

The discrimination circuit 33 controls the switching matrix 34 to sequentially connect each of the plurality of X-axis detection coils 30A to the receiving circuit 32 to detect the position of the induction coil 51 along the X-axis. For each X-axis detection coil 30A connected to the receiving circuit 32, the discrimination circuit 33 outputs a position detection signal to that X-axis detection coil 30A and determines if the induction coil 51 is close to that X-axis detection coil 30A by detection or lack of detection of an echo signal after a given delay time from the position detection signal. The discrimination circuit 33 connects each one of the X-axis detection coils 30A to the receiving circuit 32, and determines if an induction coil 51 is close to any of the X-axis detection coils 30A. If an induction coil 51 is close to one of the X-axis detection coils 30A, an echo signal will be detected when that X-axis detection coil 30A is connected to the receiving circuit 32. Consequently, the discrimination circuit 33 can determine the position of the induction coil 51 along the X-axis from the X-axis detection coil 30 that outputs an echo signal. When the induction coil 51 straddles a plurality of X-axis detection coils 30, echo signals can be detected by a plurality of X-axis detection coils 30A. In that case, the discrimination circuit 33 determines that the induction coil 51 is closest to the X-axis detection coil 30A that detects the strongest echo signal, which is the echo signal with the largest amplitude. The discrimination circuit 33 controls the Y-axis detection coils 30B in the same manner to determine the position of the induction coil 51 along the Y-axis.

The discrimination circuit 33 controls the moving mechanism 13 according to the detected X-axis and Y-axis positions to move the power supply coil 11 close to the induction coil 51. The discrimination circuit 33 controls the X-axis servo motor 22A to move the power supply coil 11 to the induction coil 51 position on the X-axis. The discrimination circuit 33 also controls the Y-axis servo motor 22B to move the power supply coil 11 to the induction coil 51 position on the Y-axis.

The first position detection controller 14A moves the power supply coil 11 to a position close to the induction coil 51 in the manner described above. The charging pad of the present invention can move the power supply coil 11 close to the induction coil 51 with the first position detection controller 14A, and subsequently transmit power from the power supply coil 11 to the induction coil 51 to charge the battery 52. However, the charging pad can further refine the position of the power supply coil 11 and move it still closer to the induction coil 51 to subsequently transmit power and charge the battery 52. The power supply coil 11 is more precisely positioned close to the induction coil 51 by the second position detection controller 14B.

Figure 14:
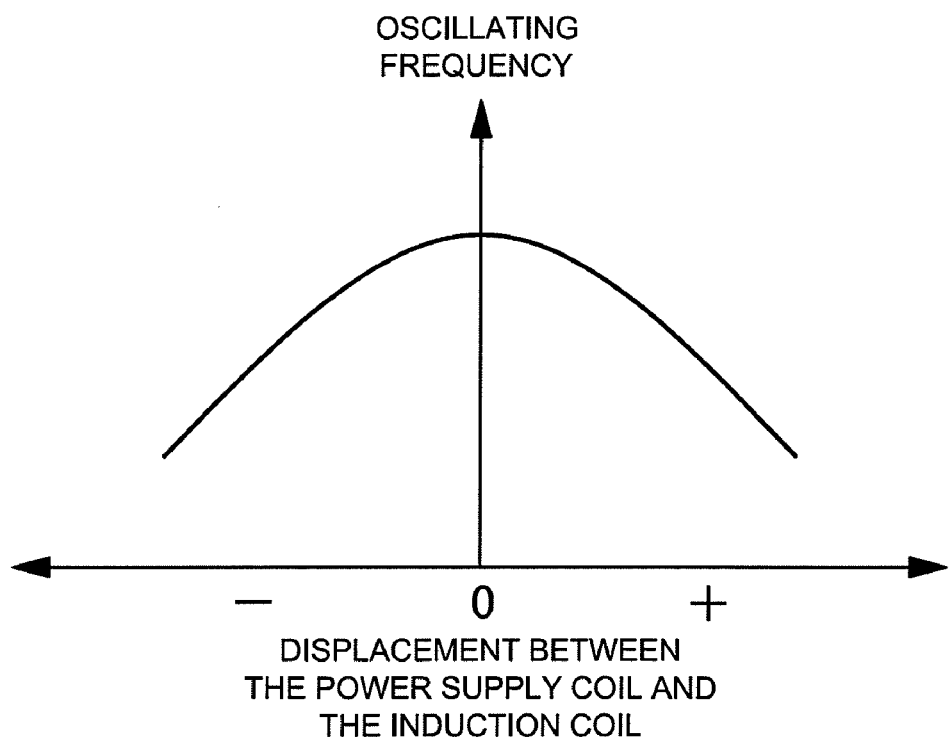
FIG. 14 is a graph showing oscillation frequency as a function of displacement between the power supply coil and the induction coil.

The second position detection controller 14B has an AC power source 12 that is a self-excited oscillator circuit, and the second position detection controller 14B controls the moving mechanism 13 to move the power supply coil 11 to a position accurately determined by the oscillating frequency of the self-excited oscillator circuit. The second position detection controller 14B controls the moving mechanism 13 X-axis servo motor 22A and Y-axis servo motor 22B to move the power supply coil 11 along the X and Y-axes while detecting the AC power source 12 oscillating frequency. Self-excited oscillator circuit oscillating frequency characteristics are shown in FIG. 14. This figure shows the change in oscillating frequency as a function of the relative offset (displacement) between the power supply coil 11 and the induction coil 51. As shown in this figure, the oscillating frequency of the self-excited oscillator circuit has a maximum where the power supply coil 11 and induction coil 51 are closest, and the oscillating frequency drops off as the two coils become separated. The second position detection controller 14B controls the moving mechanism 13 X-axis servo motor 22A to move the power supply coil 11 along the X-axis, and stops the power supply coil 11 where the oscillating frequency reaches a maximum. Similarly, the second position detection controller 14B controls the Y-axis servo motor 22A in the same manner to move the power supply coil 11 along the Y-axis, and stops the power supply coil 11 where the oscillating frequency reaches a maximum. The second position detection controller 14B can move the power supply coil 11 in the manner described above to a position that is closest to the induction coil 51.

In the charging pad described above, the first position detection controller 14A roughly detects the position of the induction coil 51. Subsequently, the second position detection controller 14B finely adjusts the power supply coil 11 position to move it still closer to the induction coil 51. However, the position detection controller 44 shown in FIG. 15 and described below can move the power supply coil 11 close to the induction coil 51 without fine adjustments.

Figure 15:
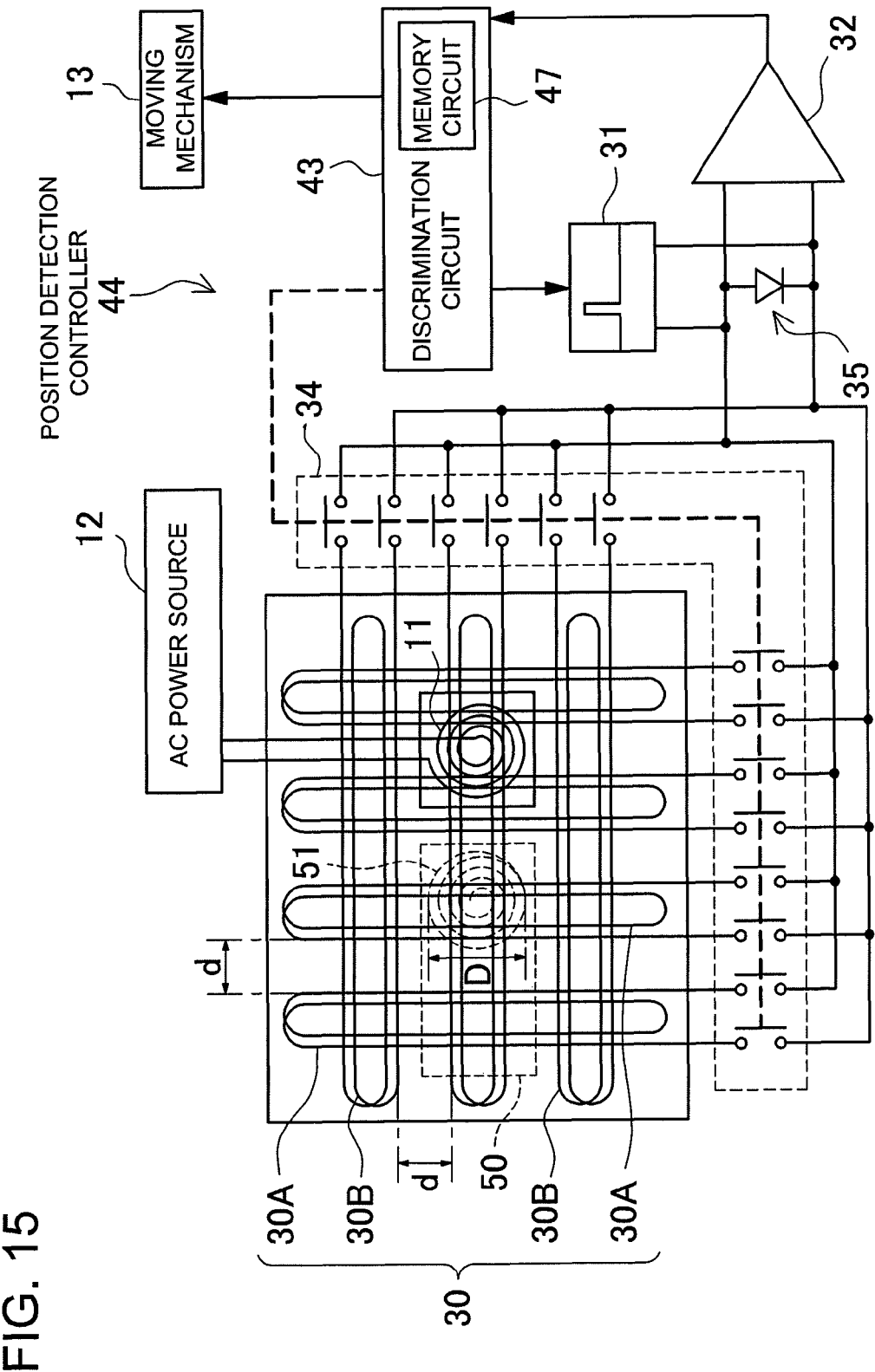
FIG. 15 is a circuit diagram showing the position detection controller of the charging pad for another embodiment of the present invention.

As shown in FIG. 15, the position detection controller 44 is provided with a plurality of position detection coils 30 fixed to the inside of the top plate, a detection signal generating circuit 31 that supplies position detection signals to the position detection coils 30, a receiving circuit 32 that receives echo signals from the position detection coils 30 resulting from excitation of the induction coil 51 by pulse signals supplied to the position detection coils 30 from the detection signal generating circuit 31, and a discrimination circuit 43 that determines induction coil 51 position from the echo signals received by the receiving circuit 32. In this position detection controller 44, the discrimination circuit 43 is provided with a memory circuit 47 to store the amplitude of echo signals induced in each position detection coil 30 corresponding to induction coil 51 position. Specifically, this is the amplitude of echo signals resulting from induction coil 51 excitation that are induced in each position detection coil 30 after a given delay time, as shown in FIG. 13. The position detection controller 44 detects the amplitude of the echo signal induced in each position detection coil 30, and compares the detected echo signal amplitude with the echo signal amplitudes stored in the memory circuit 47 to determine the induction coil 51 position.

Figure 16:
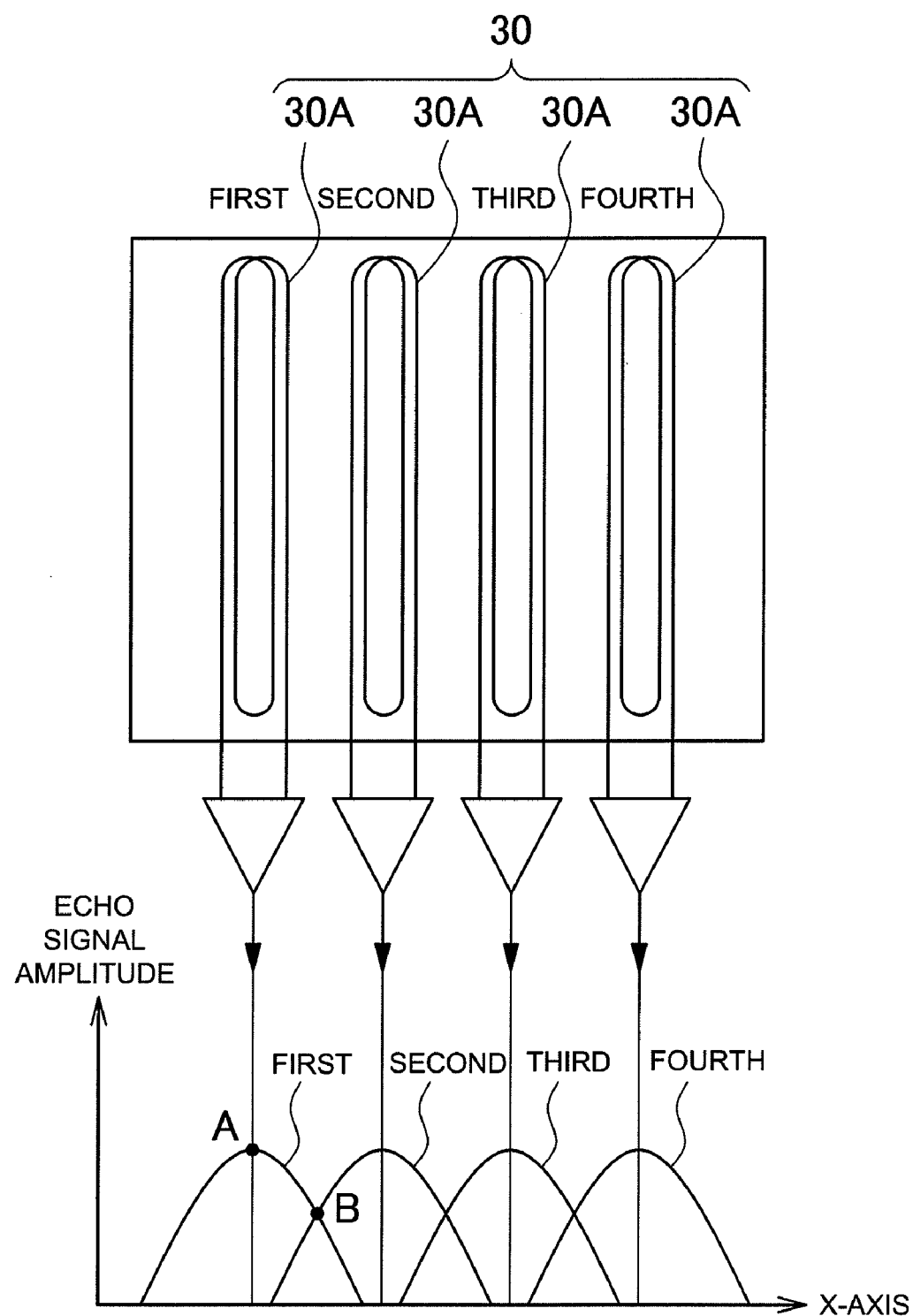
FIG. 16 is a schematic and graph showing the signal levels of echo signals induced in the position detection coils of the position detection controller shown in FIG. 15.

The position detection controller 44 determines induction coil 51 position from the amplitude of the echo signal induced in each position detection coil 30 in the following manner. The position detection coils 30 shown in FIG. 15 are provided with a plurality of X-axis detection coils 30A that detect induction coil 51 position on the X-axis, and a plurality of Y-axis detection coils 30B that detect induction coil 51 position on the Y-axis. The position detection coils 30 are fixed to the inside of the top plate 21 at specified intervals. Each X-axis detection coil 30A is a long narrow loop extending in the Y-axis direction, and each Y-axis detection coil 30B is along narrow loop extending in the X-axis direction. FIG. 16 shows the amplitude of the echo signal induced in each X-axis detection coil 30A as the induction coil 51 is moved along the X-axis. The horizontal axis of FIG. 16 shows the position of the induction coil 51 on the X-axis, and the vertical axis shows the amplitude of the echo signal induced in each X-axis detection coil 30A. This position detection controller 44 can determine the position of the induction coil 51 on the X-axis by detecting the amplitude of the echo signal induced in each X-axis detection coil 30A. As shown in FIG. 16, the amplitude of the echo signal induced in each X-axis detection coil 30A changes as the induction coil 51 position along the X-axis changes. For example, when the center of the induction coil 51 is at the center of the first X-axis detection coil 30A, the amplitude of the echo signal induced in the first X-axis detection coil 30A is a maximum as shown by point A in FIG. 16. When the induction coil 51 is halfway between the first and second X-axis detection coils 30A, the amplitude of the echo signals induced in the first and second X-axis detection coils 30A is equal as shown by point B in FIG. 16. Specifically, the amplitude of an echo signal detected in an X-axis detection coil 30A is maximum (strongest signal) when the induction coil 51 is closest to that detection coil, and the amplitude of the echo signal decreases as the induction coil 51 is separated from that detection coil. Therefore, the X-axis detection coil 30A closest to the induction coil 51 can be determined by which X-axis detection coil 30A has the largest amplitude echo signal. When echo signals are induced in two X-axis detection coils 30A, the direction of induction coil 51 offset from the X-axis detection coil 30A with the largest echo signal amplitude can be determined from the direction, relative to the X-axis detection coil 30A with the largest echo signal, of the other X-axis detection coil 30A that detects an echo signal. Further, the relative position of the induction coil 51 between two X-axis detection coils 30A can be determined from the ratio of the amplitudes of the echo signals induced in the two X-axis detection coils 30A. For example, if the ratio between echo signal amplitudes detected in two X-axis detection coils 30A is one, the induction coil 51 position can be determined to be halfway between the two X-axis detection coils 30A.

The discrimination circuit 43 stores in the memory circuit 47 the echo signal amplitude induced in each X-axis detection coil 30A corresponding to induction coil 51 position on the X-axis. When an induction coil 61 is placed on the charging pad 10, an echo signal is detected in one of the X-axis detection coils 30A. Therefore, the discrimination circuit 43 can determine from the echo signal induced in the X-axis detection coil 30A that an induction coil 51 has been placed on the charging pad 10; namely, that a device housing a battery 50 has been placed on the charging pad 10. Further, by comparing the amplitude of the echo signal induced in each X-axis detection coil 30A with the amplitudes stored in the memory circuit 47, the position of the induction coil 51 on the X-axis can be determined. The discrimination circuit can also store a function in the memory circuit that specifies induction coil X-axis position corresponding to the ratio of the amplitudes of echo signals induced in adjacent X-axis detection coils. Induction coil position can be determined from the function stored in memory. This function can be determined by moving the induction coil between two X-axis detection coils and measuring the ratio of the echo signal amplitudes in the two detection coils. Here, the discrimination circuit 43 detects the ratio of the amplitudes of echo signals induced in two X-axis detection coils 30A. Based on the function stored in memory, the X-axis position of the induction coil 51 between the two X-axis detection coils 30A can be computed from the detected echo signal amplitude ratio.

Discrimination circuit 43 detection of induction coil 61 X-axis position from echo signals induced in the X-axis detection coils 39A is described above. Induction coil 51 position on the Y-axis can be detected in a similar manner from echo signals induced in the Y-axis detection coils 30B.

When the discrimination circuit 43 has detected the induction coil 51 position on the X and Y-axes, the position detection controller 44 moves the power supply coil 11 to the induction coil 51 position based on a position signal issued from the discrimination circuit 43.

When an echo signal is detected having a waveform as described previously, the charging pad discrimination circuit 43 can recognize and distinguish that an induction coil 51 of a device housing a battery 50 has been placed on the charging pad. When a waveform is detected and determined to be different from an echo signal, an object other than the induction coil 51 of a device housing a battery 50 (for example, a metal foreign object) is assumed to be on the charging pad and the supply of power can be terminated. In addition, when no echo signal waveform is detected, it is assumed that no device housing a battery 50 induction coil 51 has been placed on the charging pad and power is not supplied.

The charging pad 10 position detection controller 14, 44 controls the moving mechanism 13 to move the power supply coil 11 close to the induction coil 51. In this state, AC power is supplied to the power supply coil 11 from the AC power source 12. AC power from the power supply coil 11 is transmitted to the induction coil 51 and used to charge the battery 52. When full-charge of the battery 52 is detected in the device housing a battery, charging is stopped and a full-charge signal is sent to the charging pad 10. The device housing a battery 50 can output a full-charge signal to the induction coil 51, and the full-charge signal can be sent from the induction coil 51 to the power supply coil 11 to transmit full-charge information to the charging pad 10. The device housing a battery 50 can output an AC signal to the induction coil 51 with a frequency different from that of the AC power source 12, and the charging pad 10 can receive that AC signal with the power supply coil 11 to detect full-charge. The device housing a battery 50 can output a full-charge signal to the induction coil 51 that is a modulated carrier wave with a specified frequency, and the charging pad 10 can receive the carrier wave of specified frequency and demodulate that signal to detect the full-charge signal. Further, the device housing a battery can wirelessly transmit a full-charge signal to the charging pad to send the full-charge information. Here, the device housing a battery contains a transmitter to send the full-charge signal, and the charging pad contains a receiver to receive the full-charge signal. The position detection controller 14 shown in FIG. 10 contains a full-charge detection circuit 17 to detect full-charge of the internal battery 52. This full-charge detection circuit 17 detects a full-charge signal sent from the device housing a battery 50 to detect battery 52 full-charge.

A charging pad 10, which has a top plate 21 where a plurality of devices housing a battery 50 can be placed, sequentially charges the battery 52 in each device housing a battery 50 to full-charge. As shown in FIG. 4, the charging pad 10 first detects the position of the induction coil 51 in any one of the devices housing a battery 50 (the first device housing a battery 50A). The power supply coil 11 is moved close to the induction coil 51, and the battery 52 in the first device housing a battery 50A is charged to full-charge. When the battery 52 in the first device housing a battery 50A reaches full-charge and the full-charge detection circuit 17 receives a full-charge signal, the position detection controller 14 detects the position of another induction coil 51 in a second device housing a battery 50B and controls the moving mechanism 13 to move the power supply coil 11 to the induction coil 51 of the second device housing a battery 50B. In this state, power is transmitted to charge the battery 52 in the second device housing a battery 50B and that battery 52 is charged to full-charge. When the battery 52 in the second device housing a battery 50B reaches full-charge and the full-charge detection circuit 17 receives a full-charge signal from the second device housing a battery 50B, the position detection controller 14 detects the position of the induction coil 51 in a third device housing a battery 50C and controls the moving mechanism 13 to move the power supply coil 11 to the induction coil 51 of the third device housing a battery 50C. In this state, power is transmitted to charge the battery 52 in the third device housing a battery 50C and that battery 52 is charged to full-charge. In this manner, when a plurality of devices housing a battery 50 are placed on the top plate 21, the charging pad 10 sequentially switches from one device housing a battery 50 to another to fully charge all the internal batteries 52. This charging pad 10 stores in memory the location of devices housing a battery 50 that have been fully charged, and does not charge the batteries 52 in devices that have been fully charged. When full-charge of the batteries 52 in all the devices housing a battery 50 placed on the top plate 21 has been detected, the charging pad 10 suspends operation of the AC power source 12 and stops battery 52 charging. In the embodiments described above and below, charging of the battery 52 in a device housing a battery 50 is stopped when full-charge is reached. However, it is also possible to treat a specific battery capacity as full-charge and stop charging when that specific battery capacity is reached.

As described above, a charging pad 10 that fully charges batteries 52 in a plurality of devices housing a battery 50 can move the power supply coil 11 to the induction coil 51 of the next device housing a battery 50 to fully charge the battery 52 in the next device when the battery 52 in the previous device has been fully charged. This can sequentially charge the batteries 52 in a plurality of devices housing a battery 50 to full-charge. Further, a charging pad 10 that charges a plurality of devices housing a battery 50 can move the power supply coil 11 to the induction coil 51 of another device housing a battery 50 when the battery 52 in the device housing a battery 50 presently being charged has not reached full-charge. By repeating this procedure, namely by switching one after another the device housing a battery 50 that is being charged, the battery 52 in each device housing a battery 50 can be fully charged. For example, the charging pad 10 can detect battery data such as battery voltage, remaining capacity, and battery temperature of the device housing a battery 50 being charged, and switch the device housing a battery 50 based on the detected data. The charging pad 10 can also move the power supply coil to the induction coil of another device housing a battery to switch the device housing a battery being charged when a specified time has elapsed. A charging pad that switches the device housing a battery being charged based on battery voltage switches the device when battery voltage reaches a predetermined voltage or when the rate of rise in voltage of the battery being charged becomes equal to a set value. The charging pad can detect remaining battery capacity to switch the device housing a battery being charged. Here, the device housing a battery being charged is switched when the remaining capacity of the battery being charged reaches a set capacity or when the change in remaining capacity becomes equal to a set value. The charging pad can detect battery temperature to switch the device housing a battery being charged. Here, the device housing a battery being charged is switched when the temperature of the battery being charged reaches a set temperature. A charging pad that switches the device housing a battery being charged when a set time has elapsed houses a timer, and the device housing a battery being charged is switched when the timer times out. In addition, the charging pad can also switch the device housing a battery being charged based on all the battery data including voltage, remaining capacity, temperature, and charging time.

The charging pad 10 described above charges the battery 52 in the next device housing a battery 50 before the previous battery 52 has reached full-charge. Since the charging pad 10 repeats this procedure to charge the devices housing a battery 50, the power transmitted from the power supply coil 11 to the induction coil 51 can be increased to fully charge a plurality of devices housing a battery 50 in a short time period. This is because battery 52 charging current can be increased when charging a single battery 52 for only a short time period. The power transmitted by a charging pad, which transmits power in a non-contact manner from a power supply coil 11 to an induction coil 51 in close proximity, is limited by unavoidable induction coil and battery heat generation caused by magnetic flux leakage. However, by switching the device housing a battery 50 during charging, the transmitted power can be increased while preventing induction coil 51 and battery 52 heat generation. Specifically, battery 52 charging current can be increased to rapidly charge the battery 52 to full-charge. This is because the battery 52 and induction coil 51 are cooled during the periods when charging is not being performed. Consequently, a charging pad 10, which switches the device housing a battery 50 being charged prior to reaching full-charge, has the characteristic that the batteries 52 can be rapidly charged to full-charge while limiting induction coil 51 and battery 52 heating.

As shown for example in FIG. 4, where three devices housing a battery 50 are placed on the top plate 21, the battery 52 in each device housing a battery 50 can be charged to full-charge in the following manner.

(1) First, the position of the induction coil 51 in any one of the devices housing a battery 50 is detected, and the power supply coil 11 is moved close to the induction coil 51 to charge the battery 52 in the first device housing a battery 50A.

(2) The position detection controller 14 suspends charging of the battery 52 in the first device housing a battery 50A based on data such as battery voltage, remaining battery capacity, and battery temperature for the first device housing a battery 50A. The position of the induction coil 51 in the second device housing a battery 50B, which is placed in a different location from the first device housing a battery 50A, is detected. The moving mechanism 13 is controlled to move the power supply coil 11 close to the induction coil 51 in the second device housing a battery 50B. In this state, power is transmitted to the second device housing a battery 50B to charge that battery 52.

(3) The position detection controller 14 suspends charging of the battery 52 in the second device housing a battery 50B based on battery data for the second device housing a battery 50B. The position of the induction coil 51 in the third device housing a battery 50C, which is placed in still a different location, is detected. The moving mechanism 13 is controlled to move the power supply coil 11 close to the induction coil 51 in the third device housing a battery 50B to charge the battery 52 in the third device housing a battery 50B.

(4) Next, The position detection controller 14 suspends charging of the battery 52 in the third device housing a battery 50C based on battery data for the third device housing a battery 50C, and the power supply coil 11 is moved to the position of the induction coil 51 in the first device housing a battery 50A to charge the battery 52 in that device.

(5) In the manner described above, the first device housing a battery 50A, the second device housing a battery 50B, and the third device housing a battery 50C are repeatedly charged to charge their internal batteries 52 to full-charge. During the process of battery 52 charging while switching the devices housing a battery 50, if any one of the batteries 52 becomes fully charged, charging is terminated for that device housing a battery 50 and the batteries 52 of the next devices housing a battery 50 are sequentially charged to full-charge. When full-charge is detected for the batteries 52 in all the devices housing a battery 50 placed on the top plate 21, the charging pad 10 stops operation of the AC power source 12 and terminates battery 52 charging.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-110176 filed in Japan on Apr. 28, 2009, the content of which is incorporated herein by reference.

What is claimed is:

1. A device housing a battery and charging pad comprising:
   a charging pad provided with a power supply coil; and
   a device housing a battery containing an induction coil that magnetically couples with the power supply coil,
   wherein the internal battery in the device housing a battery is charged with power transmitted from the power supply coil to the induction coil,
   wherein the charging pad comprises:
      a case having a charging region where a device housing a battery can be placed in a removable manner;
      an AC power source connected to the power supply coil;
      a moving mechanism that moves the power supply coil to a position in close proximity to the induction coil; and
      a position detection controller that determines the position of the device housing a battery placed on the charging region and controls the moving mechanism to move the power supply coil close to the induction coil of the device housing a battery;
   wherein the position detection controller comprises:
      position detection coils fixed to a top plate;
      a detection signal generating circuit that supplies position detection signals to the position detection coils;
      a receiving circuit that receives echo signals output from the induction coil to the position detection coils due to excitation of the induction coil by position detection signals supplied to the position detection coils from the detection signal generating circuit; and
      a discrimination circuit that determines induction coil position from the echo signals received by the receiving circuit;
   wherein the device housing a battery comprises:
      a rectifying circuit connected to the induction coil that converts AC induced in the induction coil to DC to supply the internal battery with charging power;
      a series capacitor connected in series with the induction coil to input induction coil AC to the rectifying circuit;
      a parallel capacitor connected in parallel with the induction coil 51; and
      a switching circuit that switches the connection of the series capacitor, the parallel capacitor, and the induction coil, and
   wherein when the position detection controller issues position detection signals, the parallel capacitor is connected to the induction coil by the switching circuit; when power is transmitted from the power supply coil to the induction coil, the parallel capacitor is disconnected from the induction coil, and induction coil AC is output to the rectifying circuit through the series capacitor.

2. The device housing a battery and charging pad as cited in claim 1 wherein the charging region of the charging pad is the top plate established on the top of the case.

3. The device housing a battery and charging pad as cited in claim 1 wherein the switching circuit is provided with a switching device connected in series with the parallel capacitor; when the switching device is in the ON state, the parallel capacitor is connected in parallel with the induction coil; when the switching device is in the OFF state, the parallel capacitor is disconnected from the induction coil.

4. The device housing a battery and charging pad as cited in claim 3 wherein the switching device is a field effect transistor.

5. The device housing a battery and charging pad as cited in claim 1 wherein the switching circuit is provided with a pair of series-connected switching devices; parallel capacitors are connected in series with the pair of switching devices, the connection node of the two switching devices is connected to the ground line, and each switching device is connected to an end of the induction coil through a parallel capacitor; when the pair of switching devices is in the ON state, the parallel capacitors are connected to the induction coil; when the pair of switching devices is in the OFF state, the parallel capacitors are disconnected from the induction coil.

6. The device housing a battery and charging pad as cited in claim 5 wherein the pair of switching devices are FETs.

7. The device housing a battery and charging pad as cited in claim 5 wherein the low potential side of the pair of switching devices is connected to the ground line through a resistor.

8. The device housing a battery and charging pad as cited in claim 5 wherein the rectifying circuit is provided with a diode bridge circuit, and the induction coil is connected to the ground line through diodes.

9. The device housing a battery and charging pad as cited in claim 1 wherein the series capacitor and parallel capacitor are implemented by a single series/parallel capacitor; the switching circuit is provided with a shorting circuit that short circuits the rectifying circuit side of the series/parallel capacitor; when the shorting circuit short circuits the rectifying circuit side of the series/parallel capacitor, the series/parallel capacitor is connected in parallel with the induction coil; when the shorting circuit is not short circuited, the series/parallel capacitor is connected in series with the rectifying circuit and induction coil AC is output to the rectifying circuit through the series-connected series/parallel capacitor.

10. The device housing a battery and charging pad as cited in claim 9 wherein the shorting circuit is made up of a resistance device and a switching device, and the switching device is controlled ON and OFF by a control circuit.

11. The device housing a battery and charging pad as cited in claim 10 wherein the resistance device is a positive temperature coefficient thermistor.

12. The device housing a battery and charging pad as cited in claim 10 wherein the switching device is a phototransistor that is switched ON and OFF via light.

13. The device housing a battery and charging pad as cited in claim 1 wherein the position detection controller is provided with a first position detection controller that roughly determines the position of the induction coil in the device housing a battery, and a second position detection controller that determines induction coil position with precision,
  Wherein the first position detection controller is provided with a plurality of position detection coils, a detection signal generating circuit, a receiving circuit, and a discrimination circuit,
  wherein the power supply coil is moved close to the induction coil by the first position detection controller, and subsequently the power supply coil is moved close to the induction coil by the second position detection controller.

14. The device housing a battery and charging pad as cited in claim 13 wherein the AC power source has a self-excited oscillator circuit, and the second position detection controller uses the frequency of the self-excited oscillator circuit to detect the induction coil position and control the moving mechanism.

15. The device housing a battery and charging pad as cited in claim 1 wherein the position detection controller is provided with a plurality of position detection coils fixed to the top plate, a detection signal generating circuit that supplies position detection signals to the position detection coils, a receiving circuit that receives echo signals output from the induction coil to the position detection coils due to excitation of the induction coil by position detection signals supplied to the position detection coils from the detection signal generating circuit, and a discrimination circuit that determines induction coil position from the echo signals received by the receiving circuit,
  wherein the discrimination circuit is provided with a memory circuit that stores the amplitude of the echo signal induced in each position detection coil corresponding to a given induction coil position; and the discrimination circuit compares the amplitude of the echo signal induced in each position detection coil with the amplitude of echo signals stored in the memory circuit to determine the position of the induction coil.

16. The device housing a battery and charging pad as cited in claim 1 wherein the top plate of the case is large enough to place a plurality of devices housing a battery; during charging of the internal battery in a device housing a battery where full-charge has not been reached, the position detection controller controls the moving mechanism to move the power supply coil to the position of the induction coil of another device housing a battery to fully charge each device housing a battery.

17. The device housing a battery and charging pad as cited in claim 16 wherein the position detection controller can detect at least one of the following data for the internal battery being charged: voltage, remaining capacity, and temperature; and using the detected battery data, the position detection controller can change the position of the power supply coil to switch the device housing a battery being charged.

18. The device housing a battery and charging pad as cited in claim 1 wherein the top plate is translucent to allow the power supply coil position to be visually confirmed from the outside.

19. The device housing a battery and charging pad as cited in claim 18 wherein LEDs can be provided to illuminate the power supply coil.

* * * * *